US010715794B2

(12) United States Patent
Schowengerdt et al.

(10) Patent No.: US 10,715,794 B2
(45) Date of Patent: Jul. 14, 2020

(54) METHOD AND SYSTEM FOR TRACKING EYE MOVEMENT IN CONJUNCTION WITH A LIGHT SCANNING PROJECTOR

(71) Applicant: Magic Leap, Inc., Plantation, FL (US)

(72) Inventors: Brian T. Schowengerdt, Seattle, WA (US); Mathew D. Watson, Bellevue, WA (US); Samuel Scott Frank, Shoreline, WA (US); Charles David Melville, Camano Island, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/927,855

(22) Filed: Mar. 21, 2018

(65) Prior Publication Data
US 2018/0278924 A1    Sep. 27, 2018

Related U.S. Application Data

(60) Provisional application No. 62/474,497, filed on Mar. 21, 2017.

(51) Int. Cl.
*H04N 13/383*    (2018.01)
*G02B 27/01*    (2006.01)
*G02C 11/00*    (2006.01)
*H04N 13/344*    (2018.01)
(Continued)

(52) U.S. Cl.
CPC ....... *H04N 13/383* (2018.05); *G02B 27/0081* (2013.01); *G02B 27/0093* (2013.01); *G02B 27/0172* (2013.01); *G02B 27/0179* (2013.01); *H04N 9/3129* (2013.01); *H04N 13/344* (2018.05); *G02B 2027/0123* (2013.01);
(Continued)

(58) Field of Classification Search
CPC ..................... H04N 13/383; G02B 2027/0187
See application file for complete search history.

(56) References Cited

U.S. PATENT DOCUMENTS

| 5,309,272 A | 5/1994 | Harris |
| 5,694,230 A | 12/1997 | Welch |
| 5,727,098 A | 3/1998 | Jasonbson |

(Continued)

FOREIGN PATENT DOCUMENTS

| EP | 3062142 A1 | 2/2015 |
| WO | 2018081305 A1 | 5/2018 |

OTHER PUBLICATIONS

U.S. Appl. No. 15/793,871, "Non-Final Office Action", dated Mar. 9, 2018, 9 pages.

(Continued)

*Primary Examiner* — Mainul Hasan
(74) *Attorney, Agent, or Firm* — Kilpatrickt Townsnend & Stockto LLP

(57) ABSTRACT

An eye tracking system includes a pair of glasses including two frames and a light scanning projector coupled to the pair of glasses and operable to scan a beam of light. The eye tracking system also includes an eyepiece mounted in one of the two frames and optically coupled to the light scanning projector. The eyepiece includes an exit pupil expander operable to direct at least a portion of the beam of light towards an eye of a user. The eye tracking system further includes one or more photodetectors coupled to the pair of glasses and a processor coupled to the light scanning projector and the one or more photodetectors.

20 Claims, 14 Drawing Sheets

(51) Int. Cl.
*H04N 9/31* (2006.01)
*G02B 27/00* (2006.01)

(52) U.S. Cl.
CPC ............... *G02B 2027/0178* (2013.01); *G02B 2027/0187* (2013.01); *G02C 11/10* (2013.01)

(56) References Cited

U.S. PATENT DOCUMENTS

| | | | |
|---|---|---|---|
| 7,206,107 B2 | 4/2007 | Levola | |
| 7,817,176 B2 | 10/2010 | Masuda | |
| 8,248,178 B2 | 8/2012 | Lange | |
| 2003/0146901 A1 | 8/2003 | Ryan | |
| 2003/0174978 A1 | 9/2003 | Veligdan | |
| 2004/0240064 A1 | 12/2004 | Dutta | |
| 2007/0002447 A1 | 1/2007 | Kawasaki et al. | |
| 2009/0097122 A1 | 4/2009 | Niv | |
| 2010/0149073 A1* | 6/2010 | Chaum | G02B 27/0093 345/8 |
| 2012/0038987 A1 | 2/2012 | Iizuka et al. | |
| 2012/0057235 A1 | 3/2012 | Chang et al. | |
| 2013/0077049 A1 | 3/2013 | Bohn | |
| 2013/0208362 A1* | 8/2013 | Bohn | G02B 26/00 359/630 |
| 2013/0250431 A1 | 9/2013 | Robbins et al. | |
| 2014/0092132 A1 | 4/2014 | Issa et al. | |
| 2014/0138544 A1* | 5/2014 | Sprague | G06F 3/013 250/341.8 |
| 2015/0016777 A1 | 1/2015 | Abovitz et al. | |
| 2015/0235467 A1* | 8/2015 | Schowengerdt | G02B 27/4205 345/633 |
| 2015/0260986 A1* | 9/2015 | Nortrup | G02B 27/0093 345/633 |
| 2015/0289762 A1* | 10/2015 | Popovich | A61B 3/113 351/209 |
| 2015/0378162 A1* | 12/2015 | Bailey | G02B 27/30 345/8 |
| 2016/0081547 A1* | 3/2016 | Gramatikov | G06K 9/00604 351/210 |
| 2016/0231567 A1 | 8/2016 | Saarikko et al. | |
| 2016/0231568 A1 | 8/2016 | Saarikko et al. | |
| 2016/0349514 A1* | 12/2016 | Alexander | G02B 5/32 |
| 2016/0349516 A1* | 12/2016 | Alexander | G02B 26/0833 |
| 2018/0046859 A1* | 2/2018 | Jarvenpaa | G06K 9/00604 |
| 2018/0052276 A1 | 2/2018 | Klienman et al. | |
| 2018/0113313 A1 | 4/2018 | Tekolste et al. | |
| 2018/0284440 A1* | 10/2018 | Popovich | G02B 6/0035 |
| 2019/0041634 A1* | 2/2019 | Popovich | G02B 27/017 |

OTHER PUBLICATIONS

U.S. Appl. No. 15/793,871, "Notice of Allowance", dated Jun. 15, 2018, 7 pages.
PCT/US2017/058351, "International Search Report and Written Opinion", dated Mar. 5, 2018, 11 pages.
PCT/US2017/058351, "Invitation to Pay Additional Fees and Partial Search Report", dated Jan. 9, 2018, 2 pages.
PCT/US2018/023512, "International Search Report and Written Opinion", dated May 31, 2018, 19 pages.

* cited by examiner

METHOD AND SYSTEM FOR TRACKING EYE MOVEMENT IN CONJUNCTION WITH A LIGHT SCANNING PROJECTOR

CROSS-REFERENCES TO RELATED APPLICATIONS

This application claims priority to U.S. Provisional Patent Application No. 62/474,497, filed on Mar. 21, 2017, entitled "Method and System for Tracking Eye Movement in Conjunction with a Fiber Scanning Projector," the disclosure of which is hereby incorporated by reference in its entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to projection display systems including wearable displays. More particularly, embodiments of the present invention provide methods and systems that track eye movement in relation to light scanning projector systems. In a particular embodiment, methods and systems for determining the eye orientation and motion as a function of time (i.e., eye tracking) are implemented in conjunction with a waveguide display driven by a fiber scanning projector. The invention is applicable to a variety of applications in computer vision and image display systems.

According to an embodiment of the present invention, an eye tracking system is provided. The eye tracking system includes a pair of glasses including two frames and a light scanning projector coupled to the pair of glasses and operable to scan a beam of light. The eye tracking system also includes an eyepiece mounted in one of the two frames and optically coupled to the light scanning projector. The eyepiece includes an exit pupil expander operable to direct at least a portion of the beam of light towards an eye of a user. The eye tracking system further includes one or more photodetectors coupled to the pair of glasses and a processor coupled to the light scanning projector and the one or more photodetectors.

According to an specific embodiment of the present invention, an eye tracking system is provided. The eye tracking system includes a light scanning projector and an eyepiece optically coupled to the light scanning projector. In an embodiment, the light scanning projector includes a scanning point light source or a scanning waveguide projector, for example, a fiber scanning projector. The eyepiece can include a plurality of planar waveguides, for example, four planar waveguides. In a particular embodiment, the eyepiece includes a plurality of planar waveguides including: a first planar waveguide corresponding to red wavelengths, a second planar waveguide corresponding to green wavelengths, a third planar waveguide corresponding to blue wavelengths, and a fourth planar waveguide corresponding to infrared wavelengths. As an example, the light scanning projector can output a display signal and a characterization signal. The display signal can include one or more visible wavelengths (e.g., red, green, and blue wavelengths) and the characterization signal can include one or more non-visible wavelengths (e.g., infrared wavelengths).

The eye tracking system also includes an optical sensor (e.g., a photodetector) and a processor coupled to the light scanning projector and the optical sensor. The eye tracking system can also include glasses having a frame. The light scanning projector, the eyepiece, and the optical sensor can be mounted in the frame.

According to another embodiment of the present invention, a method of operating an eye tracking system including a light scanning projector (e.g., a fiber scanning projector), an eyepiece, and an optical sensor (e.g., a photodetector) is provided. The method includes generating, using the light scanning projector, an optical signal and coupling at least a portion of the optical signal into the eyepiece. The optical signal can include a display signal and a characterization signal. The display signal can include one or more visible wavelengths (e.g., red, green, and blue wavelengths) and the characterization signal comprises one or more non-visible wavelengths (e.g., infrared wavelengths). The eyepiece can include a plurality of (e.g., four) planar waveguides.

The method also includes projecting, from the eyepiece, an image viewable by an eye of a user, detecting, using the optical sensor, light reflected from the eye of the user, and tracking a position of the eye of the user. Tracking the position of the eye of the user can include correlating a position of a series of pixels of the image with a series of intensities of the light reflected from the eye of the user.

According to another specific embodiment of the present invention, a method of tracking eye movement from a first orientation to a second orientation is provided. The method includes scanning a waveguide of a waveguide scanning projector to form a first image frame of a video image. A first series of pixels define the first image frame. The method also includes coupling the first image frame into an eyepiece including a plurality of planar waveguides, transmitting at least a portion of the first image frame to an eye of a user, and detecting a first series of reflected intensities, each of the first series being associated with a pixel of the first series of pixels. The plurality of planar waveguides can include a first planar waveguide corresponding to red wavelengths, a second planar waveguide corresponding to green wavelengths, a third planar waveguide corresponding to blue wavelengths, and a fourth planar waveguide corresponding to infrared wavelengths.

The method further includes correlating the first series of detected reflected intensities with the first series of pixels, determining the first orientation of the eye, and scanning the waveguide to form a second image frame of the video image. A second series of pixels define the second image frame. Additionally, the method includes coupling the second image frame into the eyepiece, transmitting at least a portion of the second image frame to the eye of the user, and detecting a second series of reflected intensities, each of the second series being associated with a pixel of the second series of pixels. The method further includes correlating the second series of detected reflected intensities with the second series of pixels and determining the second orientation of the eye.

In an embodiment, the method can include outputting a track related to the first orientation and the second orientation. The first image frame and the second image frame are consecutive frames of the video image. One or more additional image frames can be positioned between the first image frame and the second image frame. Coupling the first image frame into the eyepiece and coupling the second image frame into the eyepiece can include diffracting the first image frame and the second image frame using a diffractive optical element. Moreover, transmitting at least a portion of the first image frame to the eye of the user and transmitting at least a portion of the second image frame to the eye of the user can include diffracting the at least a portion of the first image frame and the at least a portion of the second image frame using one or more diffractive optical elements. The one or more diffractive optical elements can include a first diffractive optical element operable to diffract light in a plane of the eyepiece and a second diffractive optical element operable to diffract light out of the plane of the eyepiece.

According to another specific embodiment of the present invention, a method of characterizing an eye orientation is provided. The method includes scanning a fiber of a fiber scanning projector to form a first portion of an image frame of a video image. A first series of pixels define the first portion of the image frame. The method also includes coupling the first portion of the image frame into an eyepiece including a plurality of planar waveguides, transmitting at least a portion of the first portion of the image frame to an eye of a user, and detecting, at each of a plurality of optical detectors (e.g., photodetectors), a temporal reflected signal. The plurality of optical detectors can be arrayed around a periphery region of the eye. The eyepiece can be mounted in a frame having a periphery and the plurality of optical detectors can be disposed in the periphery of the frame or in a temple coupled to the frame. The plurality of planar waveguides can include a first planar waveguide corresponding to red wavelengths, a second planar waveguide corresponding to green wavelengths, a third planar waveguide corresponding to blue wavelengths, and a fourth planar waveguide corresponding to infrared wavelengths.

The method further includes correlating the plurality of temporal reflected signals with the first series of pixels and scanning the fiber to form a second portion of the image frame of the video image. A second series of pixels define the second portion of the image frame. Additionally, the method includes coupling the second portion of the image frame into the eyepiece and transmitting at least a portion of the second portion of the image frame to the eye of the user. The method further includes detecting, at each of the plurality of optical detectors, a second temporal reflected signal, correlating the plurality of second temporal reflected signals with the second series of pixels, and determining the eye orientation.

According to a particular embodiment of the present invention, a method of performing eye tracking is provided. The method includes providing a light scanning projector, an eyepiece mounted in a frame, and a plurality of optical detectors arrayed around a periphery of the frame. The method also includes projecting a first image frame to an eye using the light scanning projector and the eyepiece, detecting a plurality of time-varying reflected signals using the plurality of optical detectors, and determining a first eye orientation. The method further includes projecting a second image frame to the eye using the light scanning projector and the eyepiece, detecting a second plurality of time-varying reflected signals using the plurality of optical detectors, and determining a second eye orientation.

Numerous benefits are achieved by way of the present invention over conventional techniques. For example, embodiments of the present invention provide methods and systems that enable eye tracking in conjunction with waveguide displays having small form factors. Additionally, some embodiments utilize the light provided to drive the display as input radiation, basing the eye tracking on the reflection of this display light, thereby reducing system complexity. These and other embodiments of the invention along with many of its advantages and features are described in more detail in conjunction with the text below and attached figures.

DETAILED DESCRIPTION OF SPECIFIC EMBODIMENTS

The present invention relates generally to methods and systems related to projection display systems including wearable displays. More particularly, embodiments of the present invention provide methods and systems that track eye movement in relation to light scanning projector systems (also referred to as beam scanning projector systems). In a particular embodiment, methods and systems for determining the eye orientation and motion as a function of time (i.e., eye tracking) are implemented in conjunction with a waveguide display driven by a fiber scanning projector. The invention is applicable to a variety of applications in computer vision and image display systems.

As described herein, embodiments of the present invention leverage elements of a light scanning projector (e.g., a fiber scanning projector) to enable eye tracking. For example, a beam of light can be temporally scanned into the eye. Light reflected, either from the cornea or the retina of the eye, is detected using one or more detectors. Since the position of the beam of light as a function of time is known, the temporal variation in the reflections can be correlated with eye position, enabling gaze detection.

Figure 1:
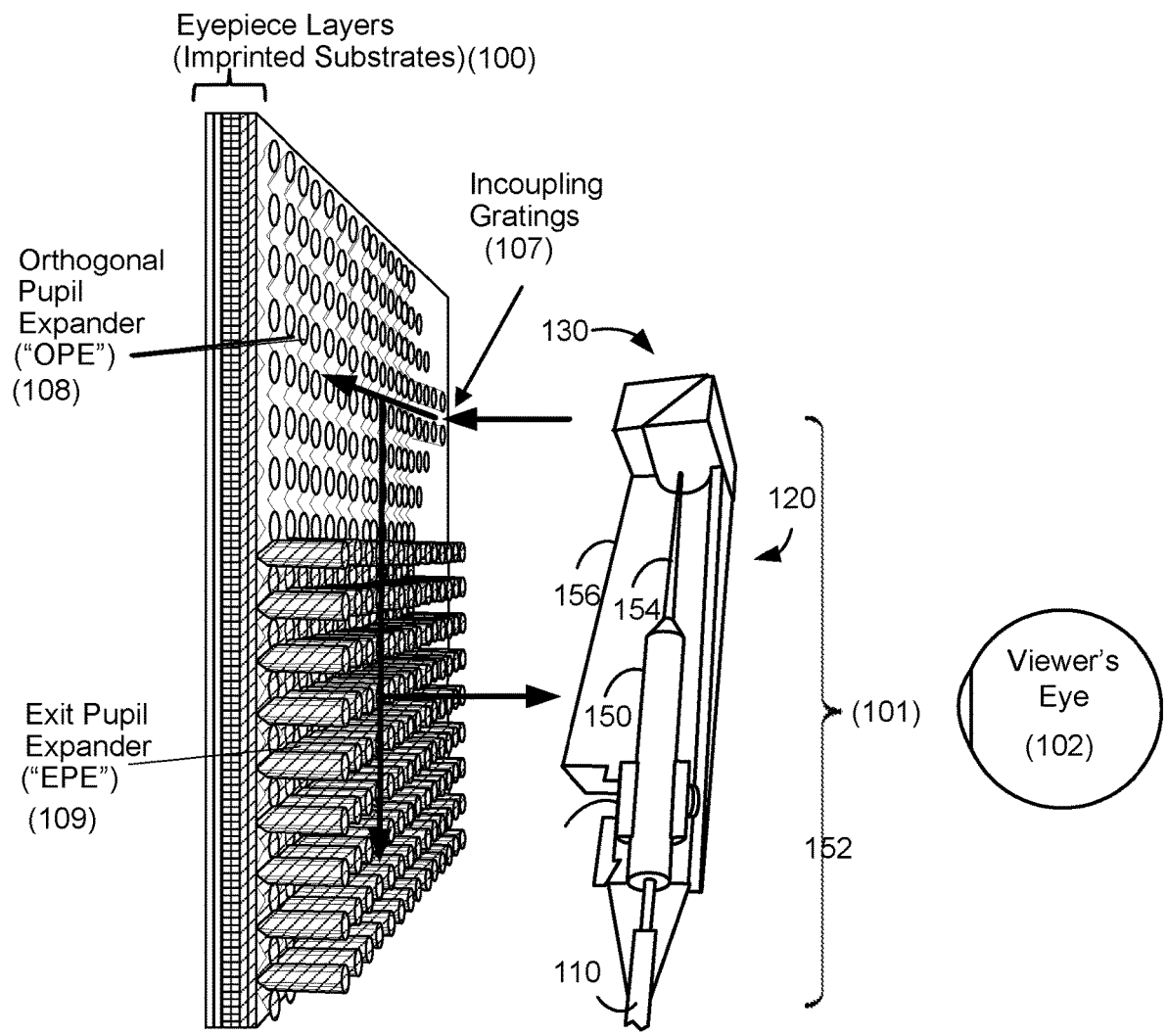
FIG. 1 illustrates schematically the light paths in a viewing optics assembly (VOA) that may be used to present a digital or virtual image to a viewer, according to an embodiment of the present invention.

FIG. 1 illustrates schematically the light paths in a viewing optics assembly (VOA) that may be used to present a digital or virtual image to a viewer, according to an embodiment of the present invention. The VOA includes a projector 101 and an eyepiece 100 that may be worn around or in front of a viewer's eye. As discussed, herein the VOA can be integrated with the frames of a pair of glasses to present the digital or virtual image to a viewer wearing these glasses.

Referring to FIG. 1, a fiber scanning projector 101 is illustrated. The fiber scanning projector 101, which can have dimensions on the order of 2 mm×2 mm×7 mm, includes a fiber input 110, a fiber oscillation region 120, and an optical assembly section 130. A piezoelectric actuator 150 is supported by a retaining collar 152 and driven by electric signals from wires (not shown). An optical fiber, also referred to as a scanning fiber, 154 is mechanically coupled to the piezoelectric actuator 150 and oscillates in the fiber oscillation region 120, for example, in a spiral configuration with an increasing angular deflection during the projection of light for a given frame time. Input light to the fiber scanning projector is provided through fiber input 110 and output light from the fiber scanning projector 101 is provided through one or more of the surfaces of optical assembly section 130. The various elements of the fiber scanning projector are described more fully in U.S. patent application Ser. No. 15/927,765, filed on Mar. 21, 2018, the disclosure of which is hereby incorporated by reference in its entirety for all purposes.

Although FIG. 1 illustrates light from fiber scanning projector 101 as directed into eyepiece 100 directly, in other embodiments, an optional projector relay 103 is utilized although this is not required by the present invention and other optical configurations can be utilized according to embodiments of the present invention. In the illustrated embodiment, light exits the optical assembly section in a direction generally perpendicular to the longitudinal axis of the mechanical enclosure 156 of the fiber scanning projector 101.

Referring to FIG. 1, a fiber scanning projector 101 is illustrated. However, it will be appreciated that other scanned light systems or scanned beam systems, which can be implemented, for example, as a scanned waveguide system, can be utilized in conjunction with embodiments of the present invention. Thus, although an optical fiber as one implementation for waveguiding light is illustrated in some embodiments, the present invention is not limited to fiber scanning systems and other waveguide scanning systems can be utilized according to other embodiments. Examples of other waveguiding systems include microelectromechanical systems (MEMS) that integrate waveguide features, for example, a silicon waveguide integrated with a cantilevered beam, into light scanning systems. Moreover, a scanning mirror system in which a beam of light is scanned by the projector, can be utilized with embodiments of the present invention as described herein. Furthermore, a scanning point source, for instance a light emitting diode (LED) or an organic LED (OLED) can be utilized in embodiments of the present invention.

During operation, the optical fiber 154, which is mechanically attached to the piezoelectric actuator 150, oscillates in the fiber oscillation region 120. In an embodiment, the piezoelectric actuator 150 includes four electrodes distributed at circumferential positions that are shifted 90° with respect to each other. Accordingly, positive and negative voltages applied to opposing sides of the piezoelectric actuator can flex the actuator, and the scanning fiber, in the plane of the electrodes. By driving all four electrodes in synchronization, oscillation of the fiber can be accomplished. As the light exits the optical fiber 154 as it scans, it is coupled into optical assembly section 130, which redirects the light toward the eyepiece 100.

The fiber scanning projector 101 can provide multiple colors, including the three primary colors, red, green, and blue (RGB) to form a full-color display. Accordingly, the eyepiece 100 may include one or more eyepiece layers. In one embodiment, the eyepiece 100 includes three eyepiece layers, one eyepiece layer for each of the three primary colors, red, green, and blue. In another embodiment, the eyepiece 100 may include six eyepiece layers, i.e., one set of eyepiece layers for each of the three primary colors configured to form a virtual image at one depth plane, and another set of eyepiece layers for each of the three primary colors configured to form a virtual image at another depth plane. In other embodiments, the eyepiece 100 may include three or more eyepiece layers for each of the three primary colors for three or more different depth planes. Each eyepiece layer comprises a planar waveguide and may include an incoupling grating 107, an orthogonal pupil expander (OPE) region 108, and an exit pupil expander (EPE) region 109.

Still referring to FIG. 1, the projector 101 projects image light onto the incoupling grating 107 in an eyepiece layer 100. The incoupling grating 107 couples the image light from the projector 101 into the planar waveguide propagating in a direction toward the OPE region 108. The waveguide propagates the image light in the horizontal direction by total internal reflection (TIR). The OPE region 108 of the eyepiece layer 100 also includes a diffractive element that couples and redirects a portion of the image light propagating in the waveguide toward the EPE region 109. The EPE region 109 includes an diffractive element that couples and directs a portion of the image light propagating in the waveguide in a direction approximately perpendicular to the plane of the eyepiece layer 100 toward a viewer's eye 102. In this fashion, an image projected by projector 101 may be viewed by the viewer's eye 102.

As described above, image light generated by the projector may include light in the three primary colors, namely blue (B), green (G), and red (R). Such image light can be separated into the constituent colors, for example, temporally or spatially, so that image light in each constituent color may be coupled to a respective waveguide in the eyepiece.

Figure 2:
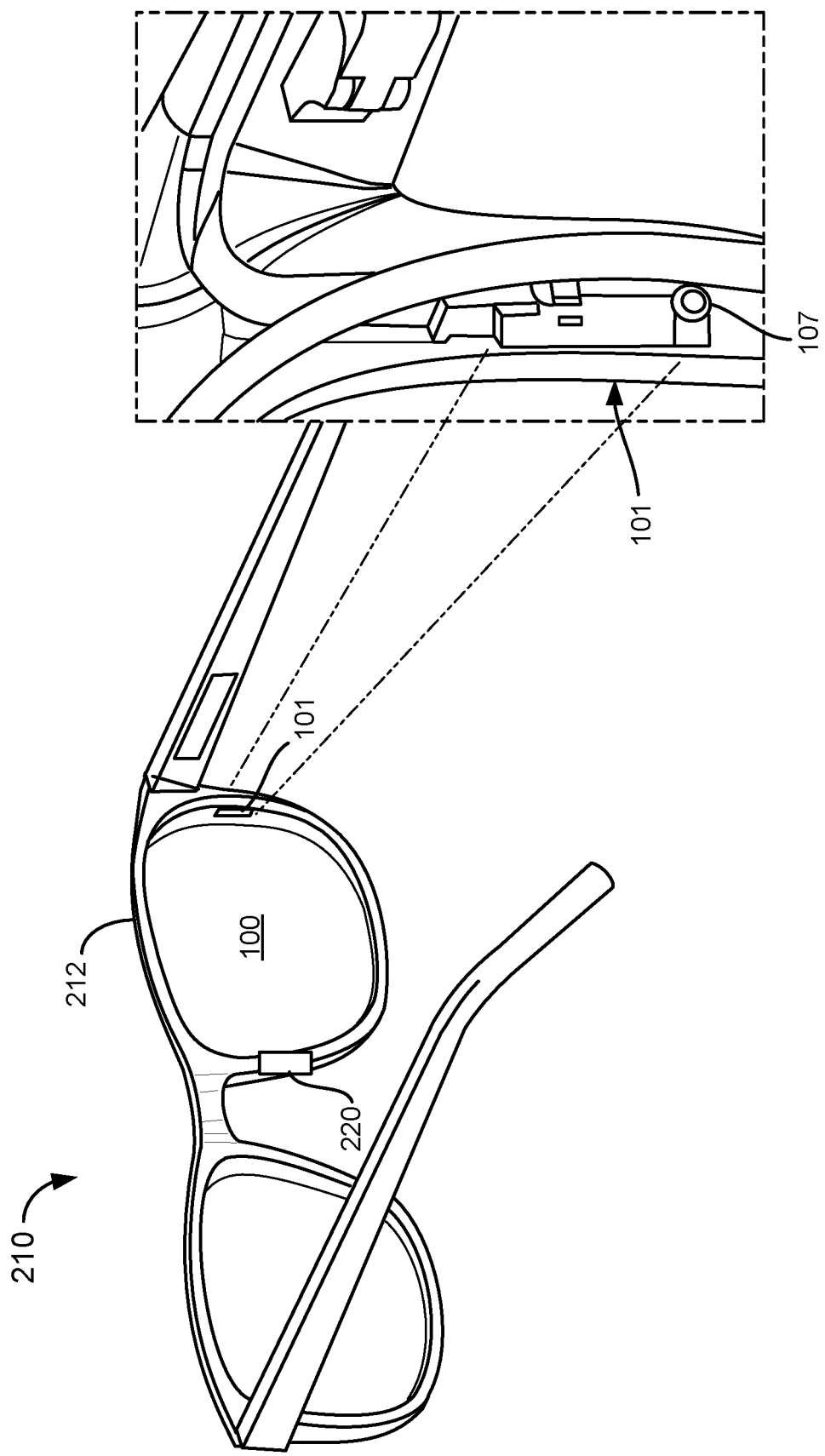
FIG. 2 is a simplified schematic diagram illustrating glasses incorporating an eye tracking system according to an embodiment of the present invention.

FIG. 2 is a simplified schematic diagram illustrating glasses incorporating an eye tracking system according to an embodiment of the present invention. As described more fully herein, small form factors comparable to standard eyeglasses are enabled by embodiments of the present invention. By utilizing embodiments of the present invention, displays with a desired field of view, depth of resolution, integrated inertial motion units (IMUs), cameras, audio components, and the like are provided. FIG. 2 illustrates glasses 210 and frame 212. As illustrated in FIG. 2, the fiber scanning projector 101 can be mounted in the frame 212 such that projected light is directed toward incoupling gratings 107. In other embodiments, the projector can be mounted in the temple of the eyeglasses. As discussed in relation to FIG. 1, the fiber scanning projector 101 works in combination with eyepiece 100 that is disposed in the frame 212 to direct the projected light toward the eye of the user. The small size of the fiber scanning projector 101 enables the integration of multiple fiber scanning projectors that can direct light toward an eye of the viewer, but this is not required by the present invention and a single projector per eye can be utilized. Although the eye tracking system is only discussed in relation to the right eye, it will be appreciated that a similar system can be utilized in conjunction with the other eye. One of ordinary skill in the art would recognize many variations, modifications, and alternatives.

According to embodiments of the present invention, in addition to integration of the projector 101 into the frame 212, one or more sensors can be integrated into the glasses as additional elements of the eye tracking system suitable for tracking of the motion of the viewer's eye. As illustrated in FIG. 2, a photodetector 220 is mounted in the frame opposite the fiber scanning projector 101. As described more fully below, light emitted from the eyepiece 100 can be reflected from the eye and be incident on photodetector 220, which can be a fast photodetector operating, for example, at kilohertz rates, at tens of kilohertz rates, or higher frequencies. In addition to optical sensors mounted in the frame, other optical configurations are included within the scope of the present invention, including a reflector or fold mirror that directs the reflected light to the one or more optical sensors. In an alternative embodiment, a refractive element is utilized to capture and route the reflected light to the optical sensor. In yet another alternative embodiment, an optical fiber, for example, a multi-mode optical fiber can be used to capture reflected light. In all of these embodiments, multiple optical sensors can be used and multiple optical elements (e.g., reflectors, fold mirrors, refractive elements, fibers, or the like), can be used to implement the methods and systems described herein. Thus, the description above related to single optical elements and the illustration of a single photodetector 220 mounted in the frame is not limiting, but only exemplary.

As the fiber scanning projector emits light in the projection path, the position of the emitted light as a function of time is known. For example, during the scanning of a spiral scan pattern associated with a frame of video, the spatial position of the emitted light as a function of time can be determined and recorded. As an example, within a 33 ms frame time associated with presentation of display frames at 30 Hz, the fiber can be scanned at rates in the range of tens of kilohertz, moving from the central portion of the display frame to the peripheral portion within the 33 ms frame time. As light is reflected from the eye and is received at the photodetector, the photodetector can be used to measure the intensity of the reflected light as a function of time (e.g., at rates of tens of kilohertz). By correlating the spatial position of the emitted light as a function of time and the measured photodetector intensity as a function of time, the spatial position associated with the reflected light can be determined. Accordingly, since the position of the emitted light at a given time is known, the light reflected at this given time can be correlated with the position. As a result, a spatial map of the reflected light can be generated and can be correlated with the optical properties of the structure reflecting the light. For the case of an eye, the spatial map of the reflected light can be correlated with a position and/or orientation of the eye. By scanning the light emitted by the fiber and forming the spatial map at different times, the system is able to track the position of the eye as a function of time.

As described herein, embodiments of the present invention utilize a scanned beam system in which pixels are scanned into the eye one at a time. In other words, the pixels are encoded as a function of angle. Considering the retina, the images are projected across the retina. By using an eyepiece to direct the scanned light to the user's eye, as described below, both visible light and characterization light are output in a superimposed manner. The reflection of the characterization light can be used to produce an image of the retina or other elements of the eye. Given that an element of the eye, for example, the fovea, is aligned with a predetermined pixel, the orientation of the eye can be determined. As this orientation changes over time, tracking of the eye is performed.

In some implementations, the light scanning projector is used not only to display images to the user, but also to receive light reflected from the eye of the user, which then propagates in a return path through the eyepiece and impinges on the optical assembly section 130. Thus, in these embodiments, the light scanning projector (e.g., a fiber scanning projector) is an element of an eye tracking system in which light produced by the light scanning projector is reflected and received by the light scanning projector for subsequent use in eye tracking calculations.

In embodiments in which light reflected from the eye is coupled back into the fiber of the fiber scanning projector, light can be coupled, not only into the core of the fiber, but the cladding of the fiber as well.

Figure 3:
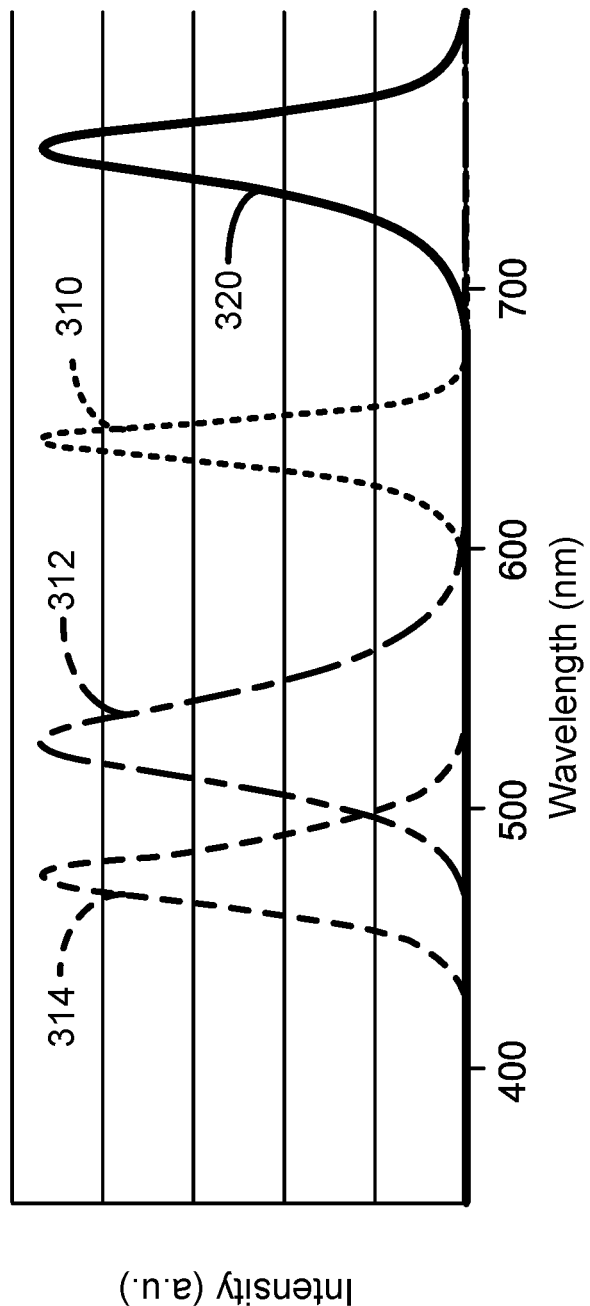
FIG. 3 is a simplified diagram illustrating several spectral profiles according to an embodiment of the present invention.

FIG. 3 is a simplified diagram illustrating several spectral profiles according to an embodiment of the present invention. In FIG. 3, red (R), green (G), and blue (B) spectral profiles associated with emitted light are illustrated as curves 310, 312, and 314. These emission profiles provide a full-color display experience for the user. FIG. 3 also illustrates infrared (IR) spectral profile 320, which is not visible to the eye, but reflects off of the cornea, retina, or other portions of the user's eye. Light in the IR region of the electromagnetic spectrum can be projected along with the RGB signal as the fiber scanning projector scans through the field of view of the display. In some embodiments, the light projected into the eyepiece can be classified as display light (e.g., RGB light) and characterization light (e.g., IR light). In a particular embodiment, the display light is visible light and the characterization light is non-visible light. In other implementations, visible light of differing wavelengths can be used for both display light and characterization light. The fundus of the eye, which includes the retina, is characterized by differing reflectivity as a function of position. Thus, as the projected light is scanned across different portions of the eye, the variations in the reflected light intensity measured using the optical sensor(s) (e.g., one or more fast photodiodes) can be used to create a fundus map of the user's eye.

In addition to a single IR band as illustrated in FIG. 3, other wavelengths can be utilized to provide for reflectivity off of the cornea. Additionally, multiple bands, for example, in the IR, could be utilized as appropriate to the particular application.

Figure 4:
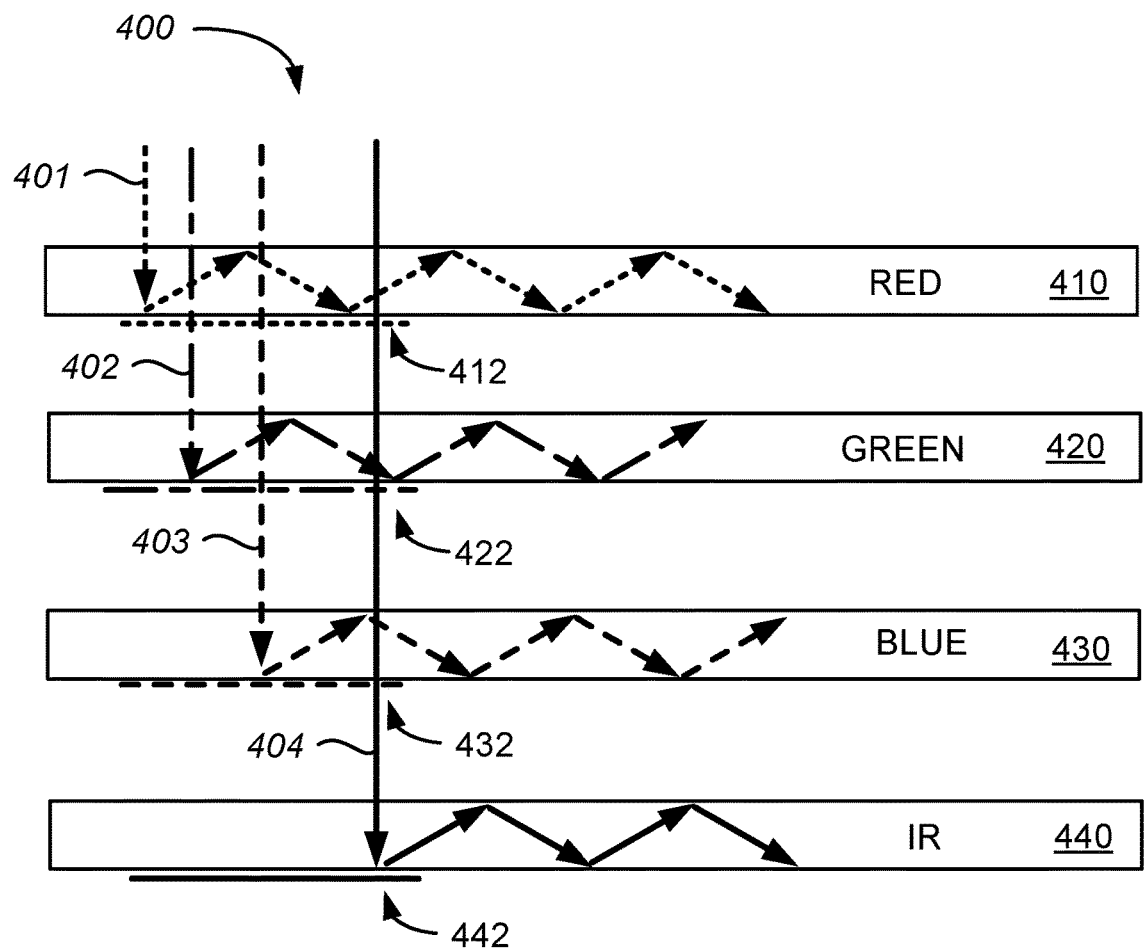
FIG. 4 is a simplified side view diagram illustrating eyepiece layers according to an embodiment of the present invention.
Figure 4:
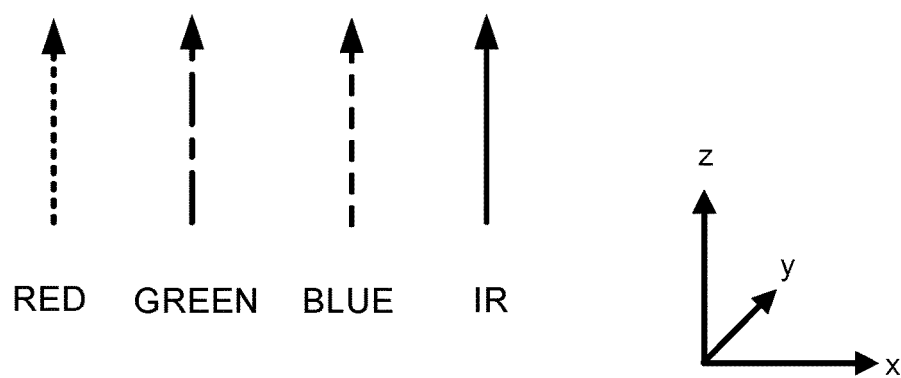

FIG. 4 is a simplified side view diagram illustrating eyepiece layers according to an embodiment of the present invention. In order to couple the display light and the characterization light into the eyepiece, an additional eyepiece layer can be provided in addition to the RGB layers. In FIG. 4, an eyepiece with aligned incoupling gratings (i.e., diffractive optical elements) is illustrated in side view.

The eyepiece 400, which can be used to project an image to an eye of a viewer, includes a first planar waveguide 410 positioned in a first lateral plane (i.e., at a first longitudinal position disposed along the z-axis). The first planar waveguide 410 comprises a first diffractive optical element (DOE) 412 disposed at a first lateral position (i.e., a first x-y coordinate position). The first DOE 412 is associated with a first wavelength range (e.g., red wavelengths) and is operable to diffract red light in this example into the first planar waveguide. First DOE 412 can be implemented using transmission gratings that couple the first wavelength into the first planar waveguide, but substantially pass wavelengths outside the first wavelength range.

The eyepiece also includes a second planar waveguide 420 positioned in a second lateral plane adjacent to the first lateral plane. The second planar waveguide includes a second DOE 422 disposed at the first lateral position below the first DOE 412. The second DOE 422 is associated with a second wavelength range (e.g., green wavelengths) and is operable to diffract green light in this example into the second planar waveguide. Second DOE 422 can be implemented using transmission gratings that couple the second wavelength into the second planar waveguide, but substantially pass wavelengths outside the second wavelength range.

A third planar waveguide 430 is positioned in a third lateral plane adjacent to the second lateral plane. The third planar waveguide includes a third DOE 432 disposed at the first lateral position below the first DOE and the second DOE and aligned along a longitudinal direction (i.e., aligned with the z-axis). The third DOE 422 is associated with a third wavelength range (e.g., blue wavelengths) and is operable to diffract blue light in this example into the third planar waveguide. Third DOE 432 can be implemented using transmission gratings that couple the third wavelength into the third planar waveguide, but substantially pass wavelengths outside the third wavelength range. Using the first three planar waveguides, visible radiation is directed toward the viewer.

In addition to the three planar waveguides 410, 420, and 430, which can be used to direct visible display light to the user, a fourth planar waveguide 440 illustrated in FIG. 4. Fourth planar waveguide 440 is positioned in a fourth lateral plane adjacent to the third lateral plane. The fourth planar waveguide includes a fourth DOE 442 disposed at the first lateral position below the first DOE, the second DOE, and the third DOE and aligned along a longitudinal direction (i.e., aligned with the z-axis). The fourth DOE 442 is associated with a fourth wavelength range that is not visible to the user (e.g., IR wavelengths) and is operable to diffract IR light in this example into the fourth planar waveguide. Fourth DOE 432 can be implemented using transmission gratings that couple the fourth wavelength into the fourth planar waveguide, but substantially pass wavelengths outside the fourth wavelength range or can be implemented as a reflective grating with mirror coating for a higher diffraction efficiency.

Although all four DOEs are aligned in the embodiment illustrated in FIG. 4, this is not required by the present invention and the DOEs can be spatially separated at different lateral positions. Moreover, the order in which the planar waveguides are arrayed can be varied as appropriate to the particular application. As an example, the second DOE (e.g., to diffract green light) can be spatially separated from the first and third DOEs, which can be aligned. In this example, since green light is in the middle of the visible spectrum, it is spatially separated from the blue and red light, which are not strongly diffracted in the DOEs for the other color, enabling the blue and red DOEs to be spatially aligned. Similarly, the fourth DOE can be spatially separated from the DOE associated with red wavelengths, for example, aligned with the blue or green DOEs. One of ordinary skill in the art would recognize many variations, modifications, and alternatives.

As discussed above, given the spatial location of the light emitted by the fiber scanning projector as a function of time, which is associated with the pixel locations of the image frame, the intensity of the light reflected from the eye, for example, in the IR spectrum, can be correlated with the pixel position to form a map of the reflected intensity. Since the reflectivity varies as a function of position on the eye, a fingerprint of the eye can be formed for each eye position or orientation. Thus, embodiments of the present invention can track the eye movement as a function of time, which can then be used to modify the manner in which virtual content is displayed, or the like. Although some embodiments are discussed in terms of image frames of a video signal (i.e., video frames), it will be appreciated that image frames are not required by the present invention. In addition to images composed into frames, embodiments of the present invention are applicable, more generally, to a known sequence of fiber positions and light outputs. For example, embodiments of the present invention are applicable to a scanning display, which rather than rendering frames, utilizes a virtual point cloud at time t, computing the desired pixel intensity given the scanner's current position. Knowing the position and intensity as a function of time enables interpretation of the eye tracking sensor signals as described herein.

Figure 5:
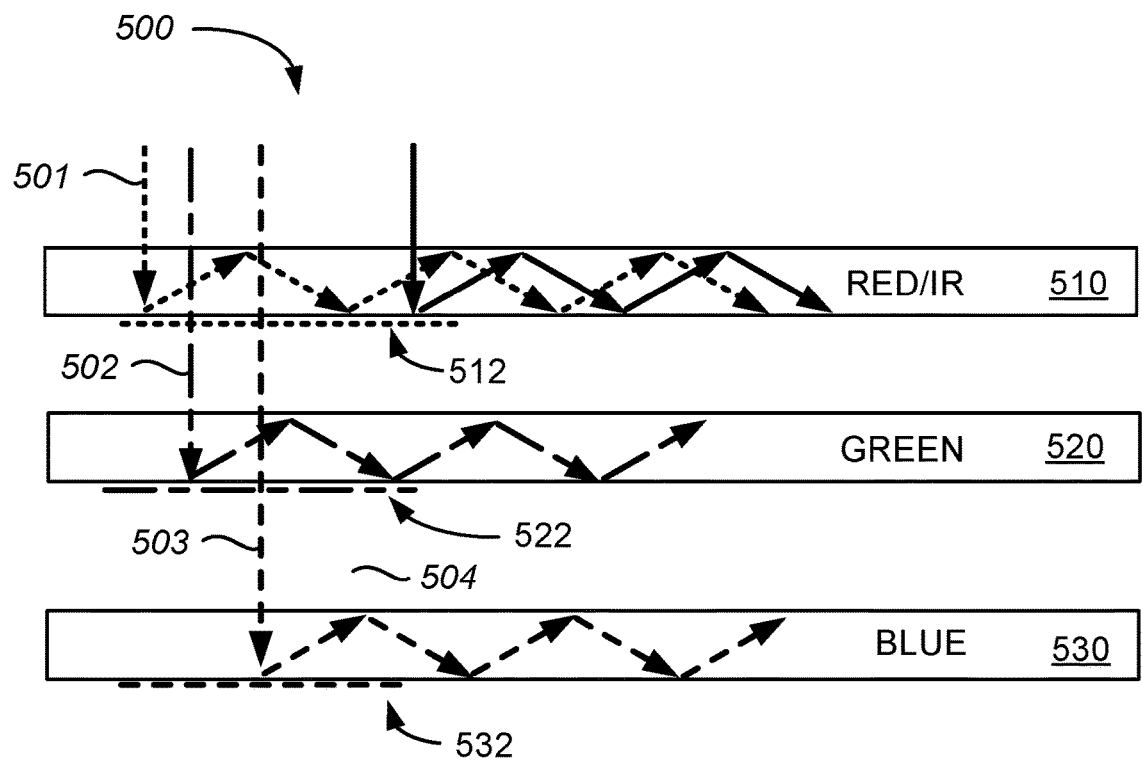
FIG. 5 is a simplified side view diagram illustrating eyepiece layers according to another embodiment of the present invention.
Figure 5:
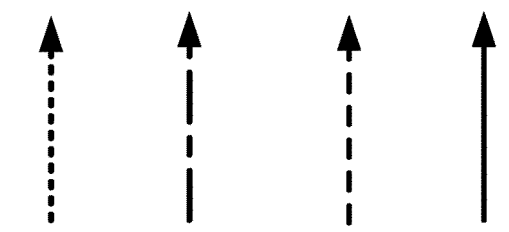
Figure 5:
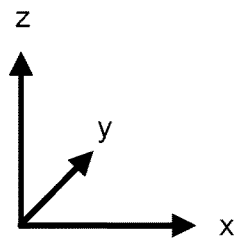

FIG. 5 is a simplified side view diagram illustrating eyepiece layers according to an alternative embodiment of the present invention. FIG. 5 shares common elements with the elements illustrated in FIG. 4 and the description provided in relation to FIG. 4 is applicable to FIG. 5 as appropriate. In the eyepiece illustrated in FIG. 5, a portion of the display light and the characterization light are coupled into one of the planar waveguides through a diffractive optical element. In the particular embodiment illustrated in FIG. 5, light in one of the visible wavelength ranges (e.g., the red wavelength range) and light in the non-visible wavelength range (e.g., the IR wavelength range) is coupled into the first planar waveguide for transmission to the eye of the user.

Referring to FIG. 5, the first planar waveguide 510 comprises a first diffractive optical element (DOE) 512 disposed at a first lateral position that is associated with a first wavelength range (e.g., red wavelengths) as well as a characterization wavelength range (e.g., IR wavelengths) and is operable to diffract light in the first wavelength range and the characterization wavelength range into the first planar waveguide. First DOE 512 can be implemented using transmission gratings that couple light in the first wavelength and light in the characterization wavelength range into the first planar waveguide, but substantially pass wavelengths outside the first wavelength range and the characterization wavelength range.

The eyepiece also includes a second planar waveguide 520 positioned in a second lateral plane adjacent to the first lateral plane. The second planar waveguide includes a second DOE 522 disposed at the first lateral position below the first DOE 512. The second DOE 522 is associated with a second wavelength range (e.g., green wavelengths) and is operable to diffract green light in this example into the second planar waveguide. Second DOE 522 can be implemented using transmission gratings that couple the second wavelength into the second planar waveguide, but substantially pass wavelengths outside the second wavelength range.

A third planar waveguide 530 is positioned in a third lateral plane adjacent to the second lateral plane. The third planar waveguide includes a third DOE 532 disposed at the first lateral position below the first DOE and the second DOE and aligned along a longitudinal direction (i.e., aligned with the z-axis). The third DOE 522 is associated with a third wavelength range (e.g., blue wavelengths) and is operable to diffract blue light in this example into the third planar waveguide. Third DOE 532 can be implemented using transmission gratings that couple the third wavelength into the third planar waveguide, but substantially pass wavelengths outside the third wavelength range.

Using these three planar waveguides, both visible radiation and radiation in the characterization wavelength range is directed toward the viewer. The light in the characterization wavelength range reflects off of the eye of the viewer and can be captured by one or more photodetectors as discussed above. Accordingly, using three planar waveguides in this embodiment, display light as well as characterization light is delivered to the viewer.

Figure 6:
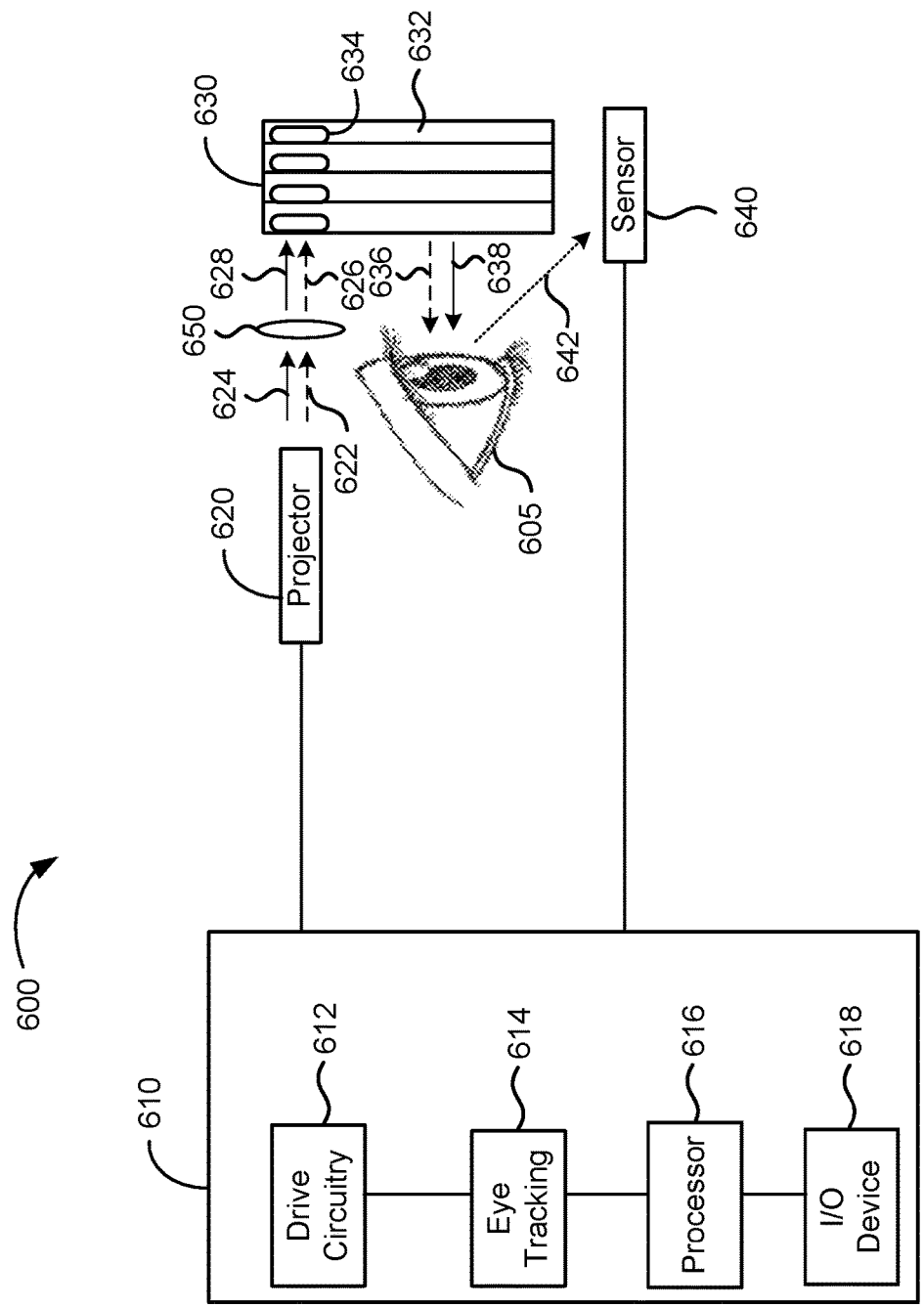
FIG. 6 is a simplified schematic diagram of an eye tracking system according to an embodiment of the present invention.

FIG. 6 is a simplified schematic diagram of an eye tracking system according to an embodiment of the present invention. The eye tracking system 600 includes an image processor 610, at least one fiber scanning projector 620, an eyepiece 630, and an optical sensor 640, The image processor can include drive circuitry 612 for driving the fiber scanning projector 620, eye tracking subsystem 614, a processor 616, and an input/output device 618. The eyepiece 630 includes a plurality of planar waveguides 632, each of which can incorporate a diffractive optical element 634. In the illustrated embodiment, the eyepiece 630 is mounted in the frame of a pair of glasses and includes four planar waveguides that operate in conjunction with three display wavelength ranges (e.g., RGB) and one characterization wavelength range (e.g., infrared).

As illustrated in FIG. 6, the drive circuitry 612 may include electronics that are in communication with the fiber scanning projector. The image processor 610 is capable of generating virtual content to be ultimately displayed to the user. The image processor 610 may convert an image or video associated with the virtual content to a format that can be projected to the user in 3D through the use of eyepieces providing multiple depth planes. Content can be received through input/output device 616 and processed using a processor 616 of the image processor 610.

In some embodiments, the eye tracking system 600 utilizes coupling optics 650 to direct the light from the fiber scanning projector 620 to the eyepiece 630. The coupling optics 650 may refer to one more conventional lenses that are used to direct the light into the eyepiece, for example, the diffractive optical element of each planar waveguide.

In operation, light output from the fiber scanning projector 650 can include both display light 622 and characterization light 624. In an embodiment utilizing coupling optics 650, the coupled display light 626 and the coupled characterization light 628 impinges on the diffractive optical element 634 of the planar waveguide layers 632. The output of the eyepiece 630 includes both image display light 636 and eyepiece characterization light 638 that propagates to the eye 605 of the user. Although both image display light 636 and eyepiece characterization light 638 are illustrated in FIG. 6 by a single ray of light, it will be appreciated that this light can exit eyepiece 630 as a diverging cone of light. One of ordinary skill in the art would recognize many variations, modifications, and alternatives.

The eyepiece characterization light that reflects from the eye is illustrated as reflected light 642 and impinges on the optical sensor 640, which can be mounted in the frame of the glasses. Because of the shape of the eye, the light that reflects from the eye, for example, from the cornea, is characterized by a cone of light that has a larger angular extent than the cone of light that is associated with either image display light 636 or eyepiece characterization light 638. In applications using a photodetector, the electrical signal output by the photodetector is transmitted to image processor 610 so that it can be processed by eye tracking subsystem 614 or other suitable processors.

Eye tracking can be performed as the eye moves over time. As an example, a first orientation of the eye during a first frame of a video image can be determined and compared to a second orientation of the eye during a subsequent second frame of the video image. Thus, over time, the orientation of the eye can be determined as follows.

The fiber of the fiber scanning projector is scanned to form a first image frame of a video image. This scanning may be characterized by a spiral pattern with increasing deflection from the central axis as a function of time. As the fiber sweeps out the scanning pattern, a first series of pixels are created that define the first image frame. This first image frame is coupled into an eyepiece that includes a plurality of planar waveguides. In some embodiments, both display light (e.g., visible light) and characterization light (e.g., infrared light) can be generated using the fiber scanning projector and different planar waveguides used to direct the light to the eye of the user. Thus, embodiments transmit at least a portion of the first image frame to the user's eye. Using the optical sensor, a first series of reflected intensities are detected. Each of this series of reflected intensities is associated with a pixel of the first series of pixels.

Considering the fiber as it scans through the pixels of the image frame, at a first time, a first pixel will be illuminated. As this first pixel is displayed, a certain amount of light will be reflected off of the eye, resulting in a first measurement for the reflected intensity. For a second pixel at a later time, a second measurement for the reflected intensity will result. Thus, over time, a series of reflected intensities will be measured, each associated with a different pixel. The amount of reflection and the value of the reflected intensities in the series will depend on the shape (e.g., radius) of the cornea where the pixel is displayed, the position at which the pixel is located on the cornea, and the like.

Thus, as the fiber sweeps through the pattern that defines the pixels of the first image frame, the timing of the pixel creation is known. This provides a spatial mapping of the pixels as a function of time. The timing of the detection of the series of reflected intensities can be correlated with the timing of the pixel creation to create a spatial map of the reflected intensities. This spatial map can be used to characterize the orientation of the eye during the first image frame.

For a subsequent image frame (i.e., a second image frame), this process can be repeated to create a second spatial map of the reflected intensities measured during the second image frame. Since the spatial maps will vary with eye position, by comparing the spatial maps collected at two different times as the video progresses, the eye position can be tracked as a function of time. In some embodiments, a calibration process is used where images are displayed and used to direct the user to look at different parts of the field of view. Measurements of the reflected intensities at each of the different eye orientations can be used to create spatial maps associated with each of the different eye orientations. This library of spatial maps can then be used to locate the eye at any time during the video display. One of ordinary skill in the art would recognize many variations, modifications, and alternatives.

Figure 7:
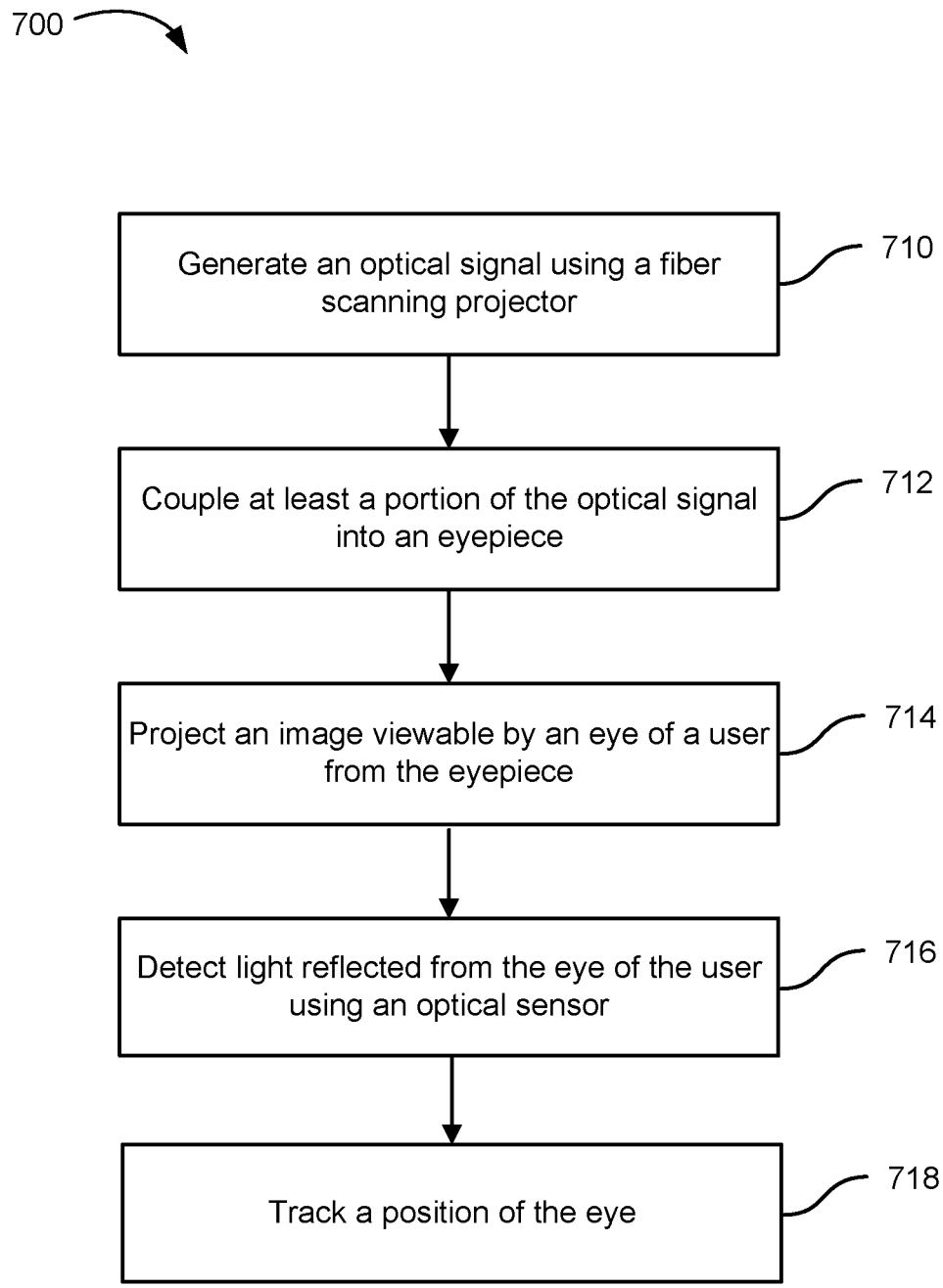
FIG. 7 is a simplified flowchart illustrating a method of operating an eye tracking system according to an embodiment of the present invention.

FIG. 7 is a method of operating an eye tracking system according to an embodiment of the present invention. The eye tracking system includes a fiber scanning projector, an eyepiece, and an optical sensor. The method 700 includes generating, using the fiber scanning projector, an optical signal (710). The fiber scanning projector can utilize elements as illustrated in FIG. 6 and other figures herein. The optical signal can include a display signal that is used to generate the light displayed to the user (e.g., one or more visible wavelengths such as red, green, and blue wavelengths) and a characterization signal that is used to provide a signal for use in eye tracking (e.g., one or more non-visible wavelengths such as infrared wavelengths). The eyepiece, as illustrated in FIGS. 4 and 5, may include a plurality of planar waveguides, for example, four planar waveguides for three visible colors and an infrared characterization signal. In some embodiments, multiple depth planes are provided by combining sets of eyepieces with differing characteristics.

The method also includes coupling at least a portion of the optical signal into the eyepiece (712) and projecting, from the eyepiece, an image viewable by an eye of a user (714). The method further includes detecting, using the optical sensor (e.g., a photodetector), light reflected from the eye of the user (716) and tracking a position of the eye of the user (718). Although a single photodetector can be utilized in some embodiments, other embodiments utilize a plurality of photodetectors and the present invention is not limited to the use of a single photodetector. Tracking the position of the eye of the user can include correlating a position of a series of pixels of the image with a series of intensities of the light reflected from the eye of the user.

In an embodiment, the optical signal includes a display signal (e.g., made up of one or more visible wavelengths) and a characterization signal (e.g., made up of one or more non-visible wavelengths, for example, infrared wavelengths). Using an eyepiece that comprises a plurality of planar waveguides disposed adjacent each other, the various wavelengths can be coupled into the planar waveguides as a function of the wavelength. For example, four planar waveguides corresponding to red, green, blue, and infrared wavelengths can be utilized.

It should be appreciated that the specific steps illustrated in FIG. 7 provide a particular method of operating an eye tracking system according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
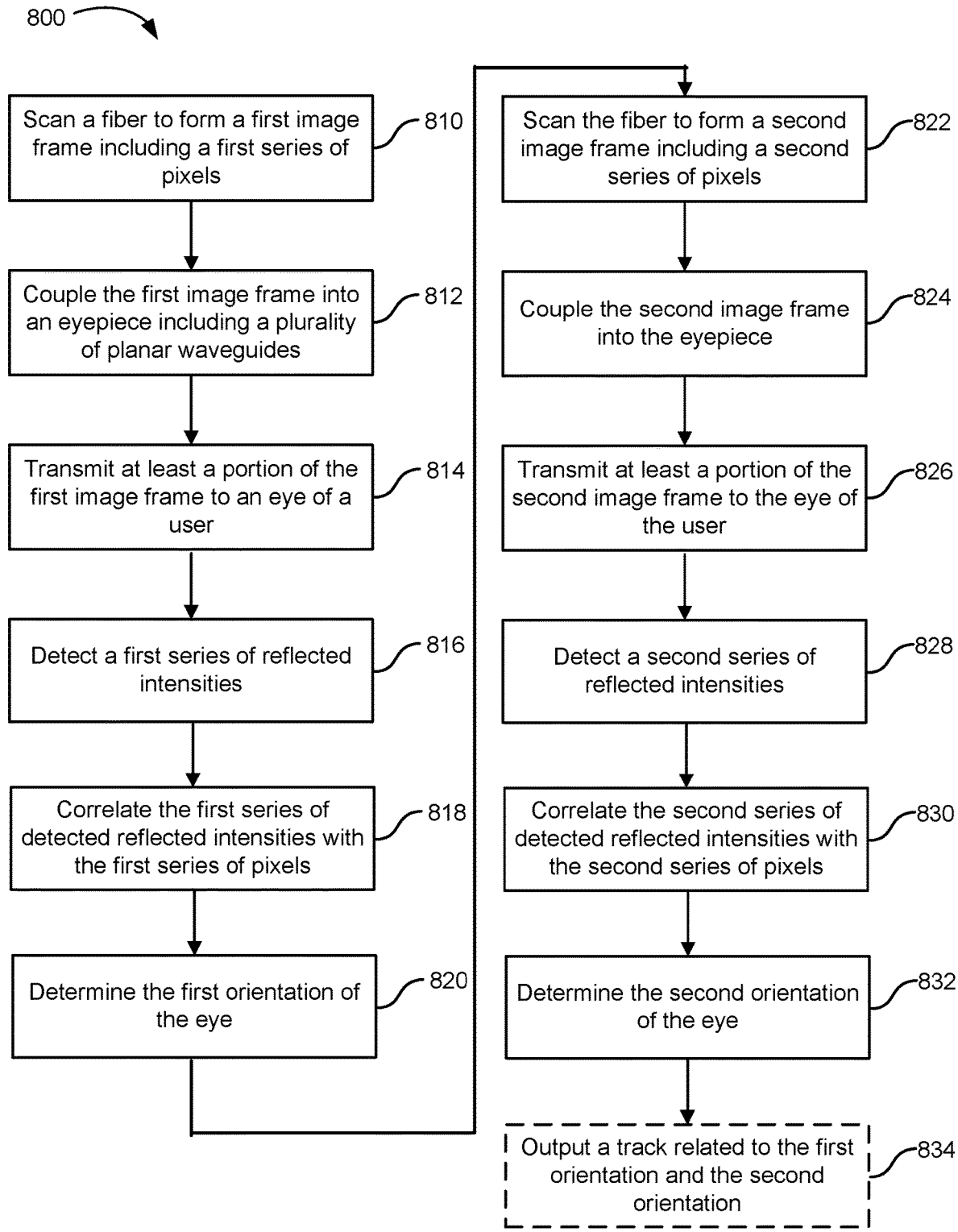
FIG. 8 is a simplified flowchart illustrating a method of tracking eye movement from a first orientation to a second orientation according to an embodiment of the present invention.

FIG. 8 is a simplified flowchart illustrating a method of tracking eye movement from a first orientation to a second orientation according to an embodiment of the present invention. The method 800 includes scanning a fiber of a fiber scanning projector to form a first image frame of a video image (810). A first series of pixels define the first image frame. The method also includes coupling the first image frame into an eyepiece including a plurality of planar waveguides (812) and transmitting at least a portion of the first image frame to an eye of a user (814). In one example, the plurality of planar waveguides can include a first planar waveguide corresponding to red wavelengths, a second planar waveguide corresponding to green wavelengths, a third planar waveguide corresponding to blue wavelengths, and a fourth planar waveguide corresponding to infrared wavelengths. Coupling of the first image frame into the eyepiece can be accomplished by diffracting the first image frame into one or more of the planar waveguides using a diffractive optical element, for example, an incoupling grating.

The method further includes detecting a first series of reflected intensities (816). Each of the first series is associated with a pixel of the first series of pixels. Additionally, the method includes correlating the first series of detected reflected intensities with the first series of pixels (818) and determining the first orientation of the eye (820).

The method also includes scanning the fiber to form a second image frame of the video image (822), wherein a second series of pixels define the second image frame, coupling the second image frame into the eyepiece (824), and transmitting at least a portion of the second image frame to the eye of the user (826). Coupling of the second image frame into the eyepiece can be accomplished by diffracting the second image frame into one or more of the planar waveguides using a diffractive optical element, for example, the incoupling grating.

Transmitting at least a portion of the first image frame to the eye of the user and transmitting at least a portion of the second image frame to the eye of the user can be accomplished by diffracting the at least a portion of the first image frame and the at least a portion of the second image frame using one or more a diffractive optical elements, for example, a first diffractive optical element operable to diffract light in a plane of the eyepiece (e.g., an orthogonal pupil expander) and a second diffractive optical element operable to diffract light out of the plane of the eyepiece (e.g., an exit pupil expander).

The method further includes detecting a second series of reflected intensities (828) each of the second series being associated with a pixel of the second series of pixels, correlating the second series of detected reflected intensities with the second series of pixels (830), and determining the second orientation of the eye (832). In an alternative embodiment, the method further includes outputting a track related to the first orientation and the second orientation (834).

The first image frame and the second image frame can be consecutive frames of the video image. Alternatively, one or more additional image frames can be positioned between the first image frame and the second image frame, which can be temporally separated in time by multiple frame periods.

As part of the implementation of the method illustrated in FIG. 8, a training process can be utilized in which the display presents the user with a series of objects to be viewed. The user is tasked with looking at the series of objects, each of which is associated with a different eye gaze. As the user looks at each of the series of objects, resulting in predetermined eye motions, the scanning of the beam of light and the corresponding reflections that are detected are used to train the system, thereby building up a database of time-varying reflections as a function of time for each eye gaze. Machine learning and other suitable techniques can be utilized in implementing such a training process. In addition to measurements made while the user is looking at a static object, tracking of moving objects by the user can be utilized as a component of the training process.

It should be appreciated that the specific steps illustrated in FIG. 8 provide a particular method of tracking eye movement from a first orientation to a second orientation according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
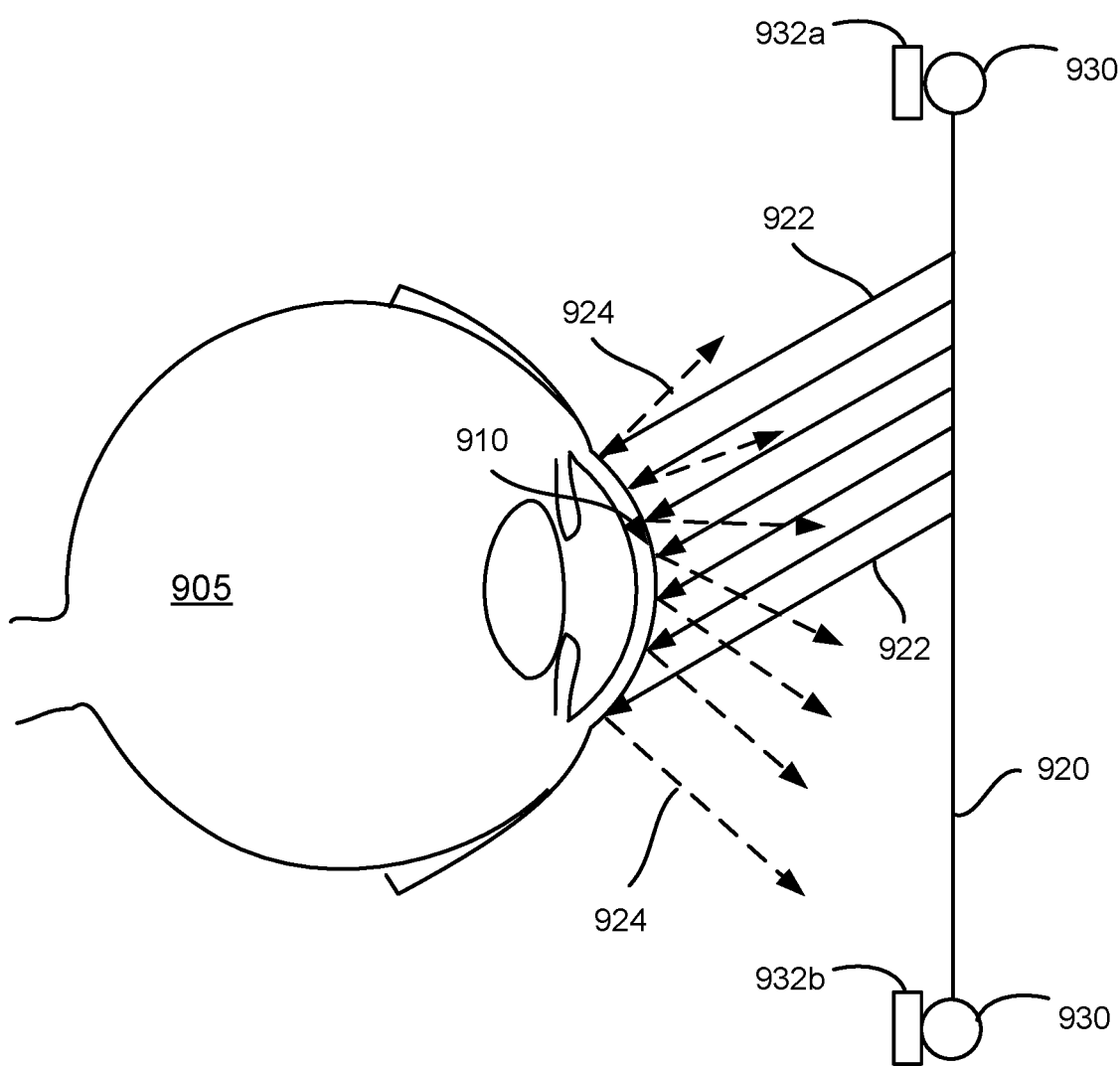
FIG. 9 is a simplified schematic diagram illustrating a side view of an eye tracking system using corneal glint according to an embodiment of the present invention.

FIG. 9 is a simplified schematic diagram illustrating a side view of an eye tracking system using corneal glint according to an embodiment of the present invention. As illustrated in FIG. 9, embodiments of the present invention provide methods and systems that are robust in high brightness applications, for example, outdoors when the signal to noise ratio for reflected light from the eye may be lower than desired.

Referring to FIG. 9, the cornea 910 of eye 905 is positioned adjacent an eyepiece 920. The eyepiece 920 can share common elements with eyepiece 500 illustrated in FIG. 5. A fiber scanning projector is used to drive the eyepiece and light emitted the eyepiece 920 is illustrated as output rays 922, which can also be referred to as beamlets. In the side view illustrated in FIG. 9, the frame 930 of the pair of glasses is shown supporting the eyepiece. The output rays 922 impinging on the cornea 910 are illustrated with solid lines and the reflected rays 924 reflecting off of the cornea are illustrated with dashed lines for purposes of clarity.

The frame 930 supports a plurality of optical detectors 932, which can be high speed photodetectors. The plurality of optical detectors 932 are arrayed around the periphery of the frame, illustrated in FIG. 9 as detectors 932a and 932b positioned at opposing edges of the frame 930. Although detectors 932a and 932b are illustrated at the top and bottom of the frame, it will be appreciated that they can be integrated at other peripheral portions, including near the temples of the glasses. As the output rays or beamlets impinge on the cornea, which is approximately spherical, light will be reflected back toward the eyepiece/frame/optical detectors at different angles from the corneal surface. In turn, some of the reflected light will reach the plurality of optical detectors, which can be embedded or otherwise mounted in the frame 930. In one embodiment, the plurality of optical detectors are arrayed at a fixed interval around the periphery, whereas in other embodiments, the array pattern can use non-fixed intervals as appropriate to the particular application. The optical detectors can be oriented so that they collect light reflected from the eye with high efficiency. Although high speed photodetectors are discussed as optical detectors herein, the present invention is not limited to photodetectors and optical fibers, multi-mode optical fibers, and other optical elements can be utilized in place of or in conjunction with a variety of optical detectors.

Consider a non-moving eye. During a first time, for example, during the first portion of a frame of video data, the first portion of the image presented to the user, defined by the output rays, will result in a first amount of reflection being detected at the plurality of optical detectors. During a second time, for example, during a second portion of the frame of video data, the portion of the image presented to the user, and the corresponding output rays, will be changed with respect to the output rays defining the first portion of the image. This results from the fact that a scanning fiber projector is utilized to drive the eyepiece and the angle swept out by the scanning fiber varies as a function of time. Accordingly, during the second time, the amount of reflection detected at the plurality of optical detectors will change with respect to the first amount of reflection detected by the plurality of optical detectors. Thus, for the plurality of optical detectors arrayed around the periphery of the frame, even for a non-moving eye, a time-varying amount of light will be detected as a function of scan angle. The dynamic nature of the scanning beam provides, in effect, a dynamic glint generator since the reflections from the cornea that vary as a function of time can be considered as glints that vary as a function of time. Gaze detection is enabled by correlating the eye gaze with the pattern of reflections/glints detected as a function of time.

The system can be calibrated, providing a unique characterization, similar to a fingerprint, for a number of eye gazes or orientations as discussed above in relation to FIG. 8. By having the user look in a first direction, the time-varying change in detected intensity at each of the plurality of optical detectors can be characterized to define a unique characterization associated with this first direction. When the user looks in a second, different direction, a different time-varying change in detected intensity can be measured and used to define a second unique characterization associated with this second direction. A calibration process can perform these characterization for a number of eye orientations, which can facilitate the formation of a look up table or other suitable pattern identifier to correlate eye gaze or orientation of the unique characterizations. As mentioned above, in addition to a look up table, machine learning techniques, which can be more computationally efficient, can be employed.

In operation, the time-varying change in detected intensity can be measured and matched to the unique characterization for the given orientation at a series of times to provide for eye tracking.

Figure 10:
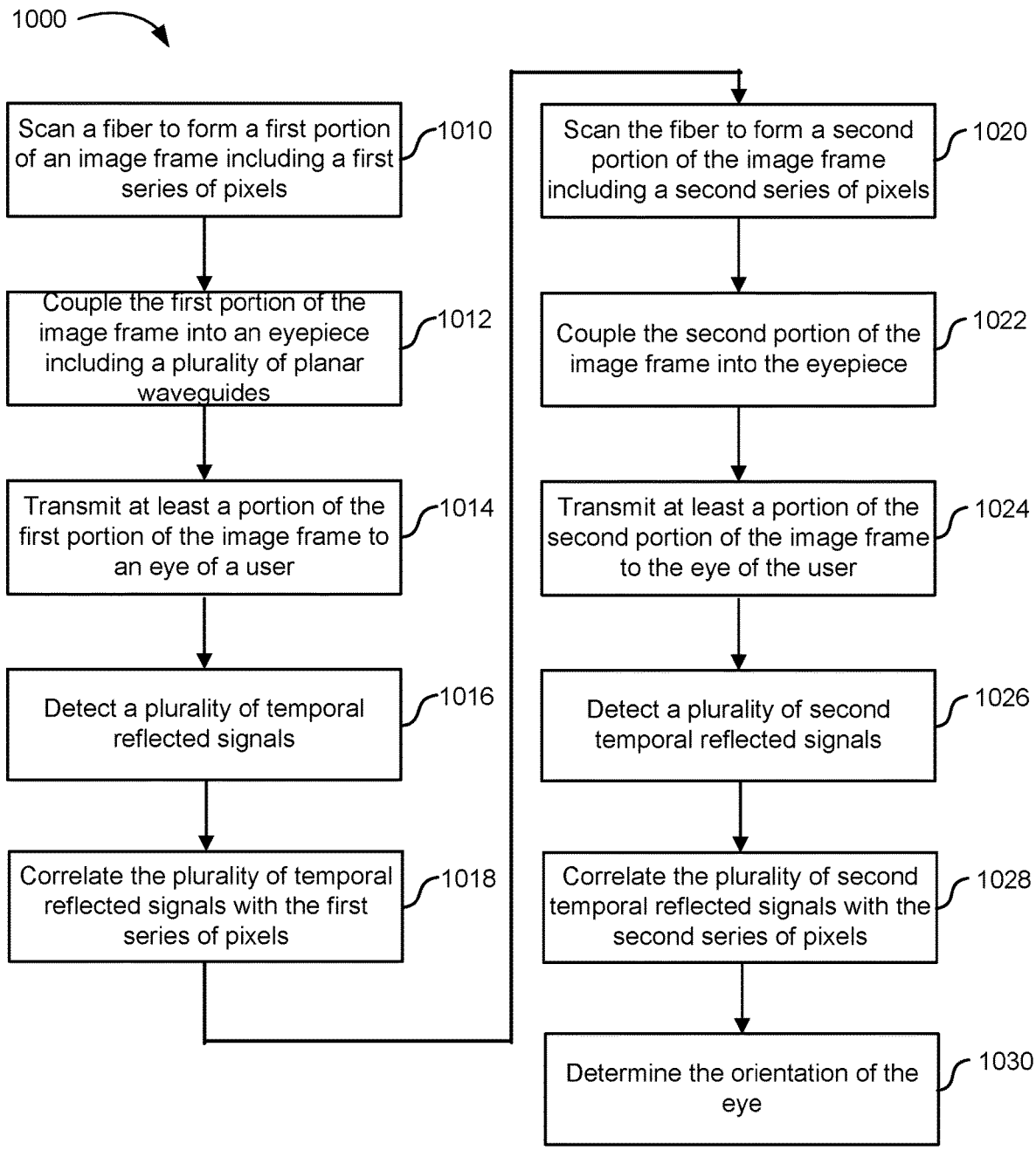
FIG. 10 is a simplified flowchart illustrating a method of characterizing an eye orientation according to an embodiment of the present invention.

FIG. 10 is a simplified flowchart illustrating a method of performing eye tracking using corneal glint according to an embodiment of the present invention. The method 1000 includes scanning a beam of a light scanning projector (e.g., a fiber scanning projector) to form a first portion of an image frame of a video image (1010). A first series of pixels define the first portion of the image frame. The method also includes coupling the first portion of the image frame into an eyepiece including a plurality of planar waveguides (1012), transmitting at least a portion of the first portion of the image frame to an eye of a user (1014), and detecting, at each of a plurality of optical detectors, a temporal reflected signal (1016). In some embodiments, rather a plurality of optical detectors, a single detector is utilized, for example, mounted on the temple adjacent the frame including the eyepiece.

The plurality of planar waveguides can include a first planar waveguide corresponding to red wavelengths, a second planar waveguide corresponding to green wavelengths, a third planar waveguide corresponding to blue wavelengths, and a fourth planar waveguide corresponding to infrared wavelengths. The plurality of optical detectors can be a plurality of photodetectors, which can arrayed around a periphery region of the eye. As illustrated in FIG. 2, the eyepiece can mounted in a frame and the plurality of photodetectors can be disposed around the periphery of the frame. In other embodiments, one or more detectors are mounted in the temple that is connected to the frame. The method further includes correlating the plurality of temporal reflected signals with the first series of pixels (1018).

Additionally, the method includes scanning the beam to form a second portion of the image frame of the video image (1020). A second series of pixels define the second portion of the image frame. The method also includes coupling the second portion of the image frame into the eyepiece (1022), transmitting at least a portion of the second portion of the image frame to the eye of the user (1024), and detecting, at each of the plurality of optical detectors, a second temporal reflected signal (1026). Furthermore, the method includes correlating the plurality of second temporal reflected signals with the second series of pixels (1028) and determining the eye orientation (1030). As discussed above, the plurality of optical detectors can be replaced with a single detector per eyepiece, for example, a high speed photodetector. One of ordinary skill in the art would recognize many variations, modifications, and alternatives.

It should be appreciated that the specific steps illustrated in FIG. 10 provide a particular method of characterizing an eye orientation according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
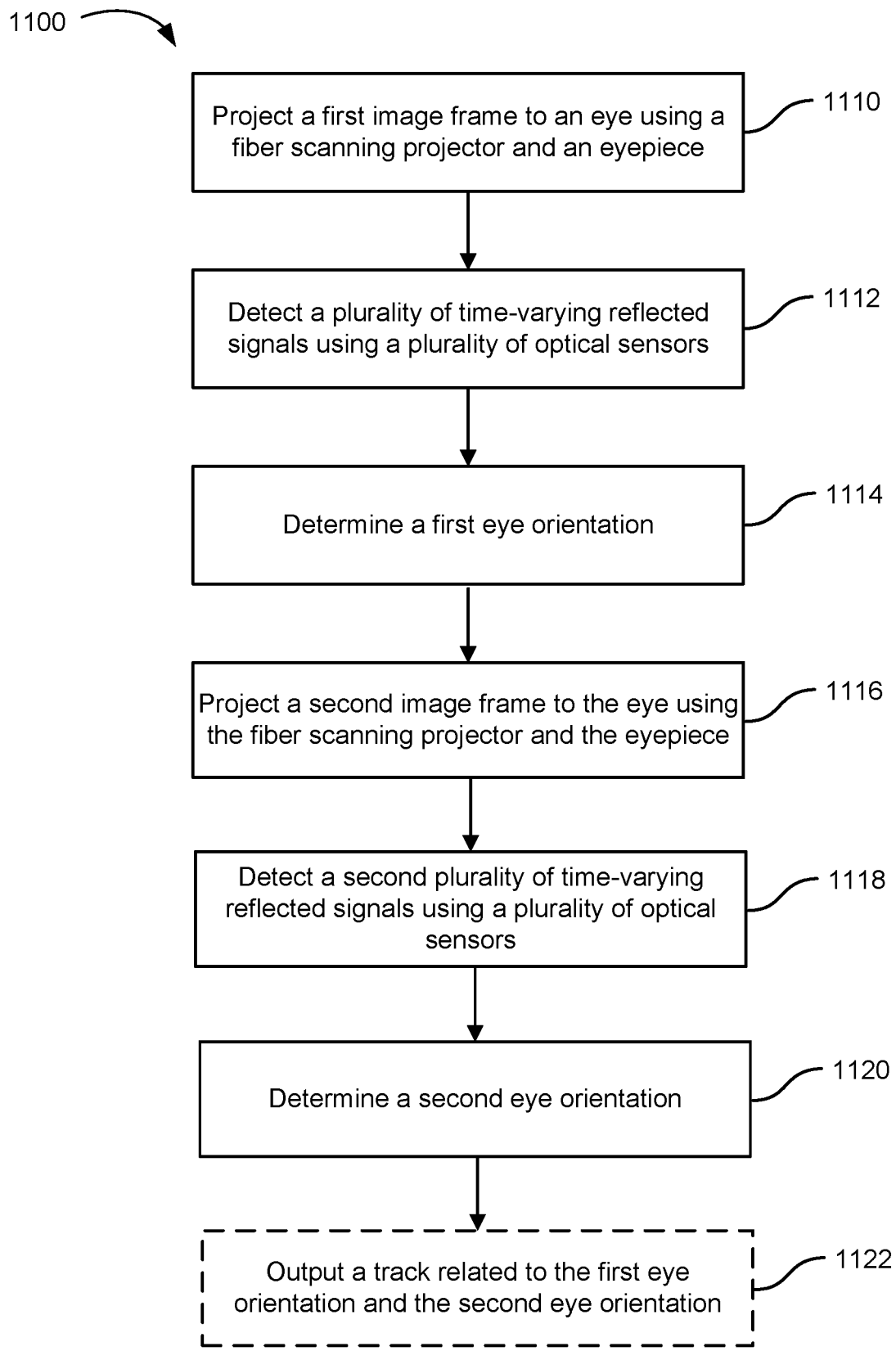
FIG. 11 is a simplified flowchart illustrating a method of performing eye tracking according to an embodiment of the present invention.

FIG. 11 is a simplified flowchart illustrating a method of performing eye tracking according to an embodiment of the present invention. The method 1100 includes providing a fiber scanning projector, an eyepiece mounted in a frame, and a plurality of optical detectors arrayed around a periphery of the frame. The eyepiece can include a plurality of planar waveguides.

The method also includes projecting a first image frame to an eye using the fiber scanning projector and the eyepiece (1110), detecting a plurality of time-varying reflected signals using the plurality of optical detectors (1112), and determining a first eye orientation (1114). Projecting the first image frame to the eye can include coupling portions of the first image frame into each of the plurality of planar waveguides and transmitting at least a portion of the coupled portions to the eye of the user.

The method further includes projecting a second image frame to the eye using the fiber scanning projector and the eyepiece (1116), detecting a second plurality of time-varying reflected signals using the plurality of optical detectors (1118), and determining a second eye orientation (1120). Projecting the second image frame to the eye can include coupling portions of the second image frame into each of the plurality of planar waveguides and transmitting at least a portion of the coupled portions to the eye of the user. In an alternative embodiment, the method further includes outputting a track related to the first eye orientation and the second eye orientation.

As discussed in relation to FIG. 10, the plurality of time-varying reflected signals can be associated with increasing scan angle of the fiber scanning projector during the first image frame as the fiber scans, for example, at larger angles during the frame. The second plurality of time-varying reflected signals can also be associated with increasing scan angle of the fiber scanning projector during the second image frame. The first image frame and the second image frame can be consecutive frames of the video image. Alternatively, one or more additional image frames can be positioned between the first image frame and the second image frame.

It should be appreciated that the specific steps illustrated in FIG. 11 provide a particular method of performing eye tracking according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12A:
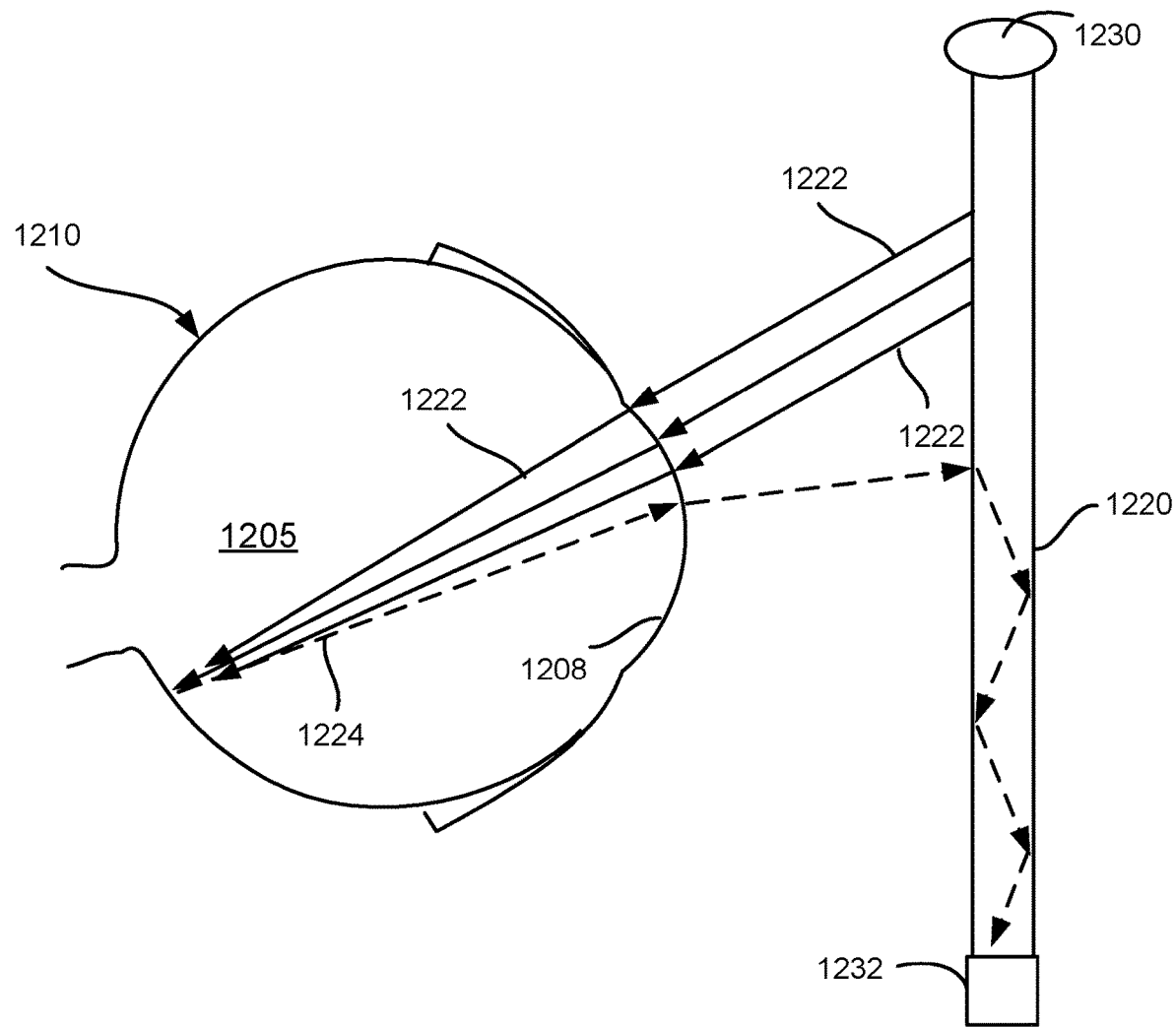
FIG. 12A is a simplified schematic diagram illustrating a side view of an eye tracking system according to an embodiment of the present invention.

FIG. 12A is a simplified schematic diagram illustrating a side view of an eye tracking system according to an embodiment of the present invention. As illustrated in FIG. 12A, embodiments of the present invention provide methods and systems that are robust in high brightness applications, for example, outdoors when the signal to noise ratio for reflected light from the eye may be lower than desired. Embodiments of the present invention and the elements illustrated in FIG. 12 can be considered in light of a scanning laser ophthalmoscope.

Referring to FIG. 12A, the eye 1205 is positioned adjacent an eyepiece 1220. The eyepiece 1220 can share common elements with eyepiece 500 illustrated in FIG. 5. A fiber scanning projector is used to drive the eyepiece and light emitted the eyepiece 1220 is illustrated as output rays 1222, which can also be referred to as beamlets. In the side view illustrated in FIG. 12, the frame 1230 of the pair of glasses is shown supporting the eyepiece. The output rays 1222 passing through the cornea 1208 and impinging on the retina 1210 are illustrated with solid lines and the reflected rays 1224 reflecting off of the retina are illustrated with dashed lines for purposes of clarity. As illustrated in FIG. 12A, refraction by the crystal lens and the cornea (not shown) results in the beamlets being focused at a point on the retina, which is correlated with a pixel of the display. If the output rays 1222 include wavelengths, for example, infrared wavelengths, at which the retina is highly reflective, reflected light at these wavelengths will tend to propagate substantially on-axis through the eye and the cornea after reflection from the retina. Following substantially the reverse optical path, the reflected rays 1224, are illustrated as diverging slightly for purposes of clarity. Because the reflected rays 1224 propagate along a path that is substantially the same axis as the output rays 1222, the detectors are preferably in the field of view rather than peripheral to the field of view.

After reflection from the retina 1210, reflected rays 1224 impinge on the eyepiece 1220 and are coupled into the eyepiece (e.g. by diffraction), where they propagate inside the eyepiece by total internal reflection. In the illustrated embodiment, the frame 1230 supports one or more optical detectors 1232, which can be high speed photodetectors. The one or more optical detectors 1232 can be arrayed around the periphery of the eyepiece and the frame to capture light reflected at a number of angles. The light can be coupled from the eyepiece to the optical detector without the use of a orthogonal coupling element, for example, an outcoupling grating, but can pass through the edge of the eyepiece to the optical detector as shown in FIG. 12A. The efficiency of coupling from the eyepiece to the optical detector can thus be higher than is typically achieved using an orthogonal coupling element. In this embodiment, the eyepiece is thus used as a collecting element that can be coupled with one or more optical detectors integrated with the eyepiece and operable to detect reflected light that are placed outside the field of view of the user. Operation of the detectors can share similar functionality with the detectors discussed in relation to other embodiments herein.

Figure 12B:
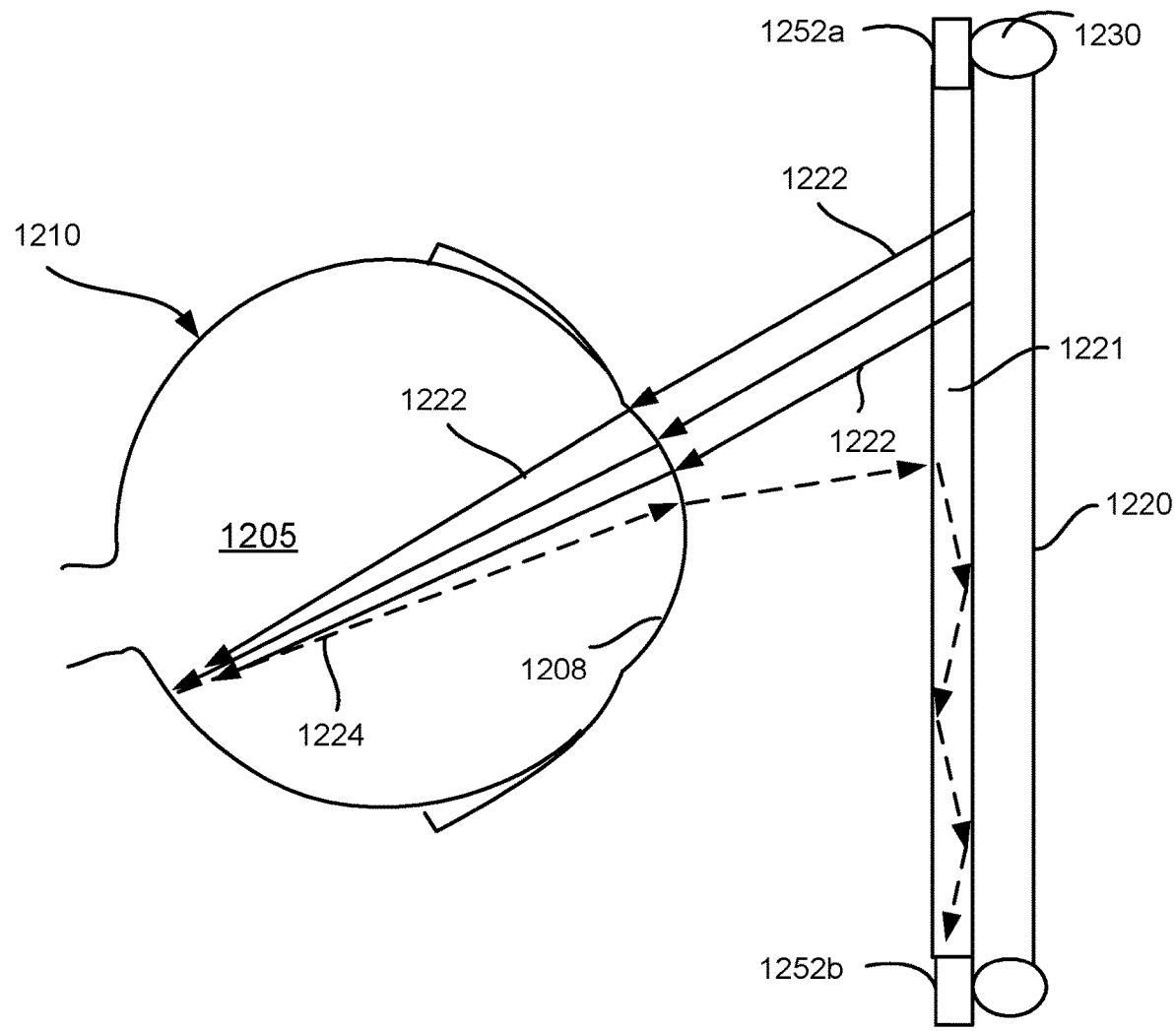
FIG. 12B is a simplified schematic diagram illustrating a side view of an eye tracking system according to an alternative embodiment of the present invention.

FIG. 12B is a simplified schematic diagram illustrating a side view of an eye tracking system according to an alternative embodiment of the present invention. In this alternative embodiment, an additional diffractive structure 1221 is integrated with the eyepiece 1220 to diffract the light reflected from the retina to the one or more detectors 1252. As an example, an additional diffractive structure 1221 that is efficient at infrared wavelengths could be integrated with the eyepiece 1220 (e.g., laminated to the back of the eyepiece) to direct reflected light 1224 to detectors 1252*a* and 1252*b*. Although detectors 1252*a* and 1252*b* are illustrated at the top and bottom of the frame, it will be appreciated that they can be integrated at other peripheral portions, including near the temples of the glasses. One of ordinary skill in the art would recognize many variations, modifications, and alternatives.

As discussed in relation to FIG. 12A, the light propagating in the additional diffractive structure 1221 by TIR can be coupled from the additional diffractive structure to the optical detector without the use of a orthogonal coupling element, for example, an outcoupling grating, but can pass through the edge of the additional diffractive structure to the optical detector as shown in FIG. 12B. As a result, the efficiency of coupling from the additional diffractive structure to the optical detector 1252*a*/1252*b* can thus be higher than is typically achieved using an orthogonal coupling element.

Although not illustrated in FIGS. 12A and 12B, optical detectors could be placed to the right of (i.e., in front of) the eyepiece 920 and used to detect light reflected from the retina. Additionally, beam splitters or mirrors that preferentially reflect infrared light (i.e., hot mirrors) can be utilized to separate reflected infrared light from reflected light in other wavelength bands. One of ordinary skill in the art would recognize many variations, modifications, and alternatives.

The diffractive properties of either the eyepiece or the additional diffractive structure can be varied spatially to increase the information content available using the system. It should be noted that the diffractive structures can be either image relaying (i.e., image preserving) or will not preserve imaging effects. As an example, a multi-mode fiber coupled to a detector could be optically coupled to the eyepiece at a peripheral location for non-image preserving applications. As another example, in relation to the spatial variation discussed above, an array of fibers that are spatially separated could be optically coupled to the eyepiece. As the eye/cornea rotates, the distribution of reflected light that impinges on the spatially separated array will vary and this temporal/spatial variation as the eye/cornea rotates can be used to encode the orientation of the eye.

For example, the spatial variation of the eyepiece of the additional diffractive structure could be implemented as a set of radial sections, each diffracting light toward a detector mounted at the periphery and associated with each of the radial sections. One of ordinary skill in the art would recognize many variations, modifications, and alternatives.

Figure 12C:
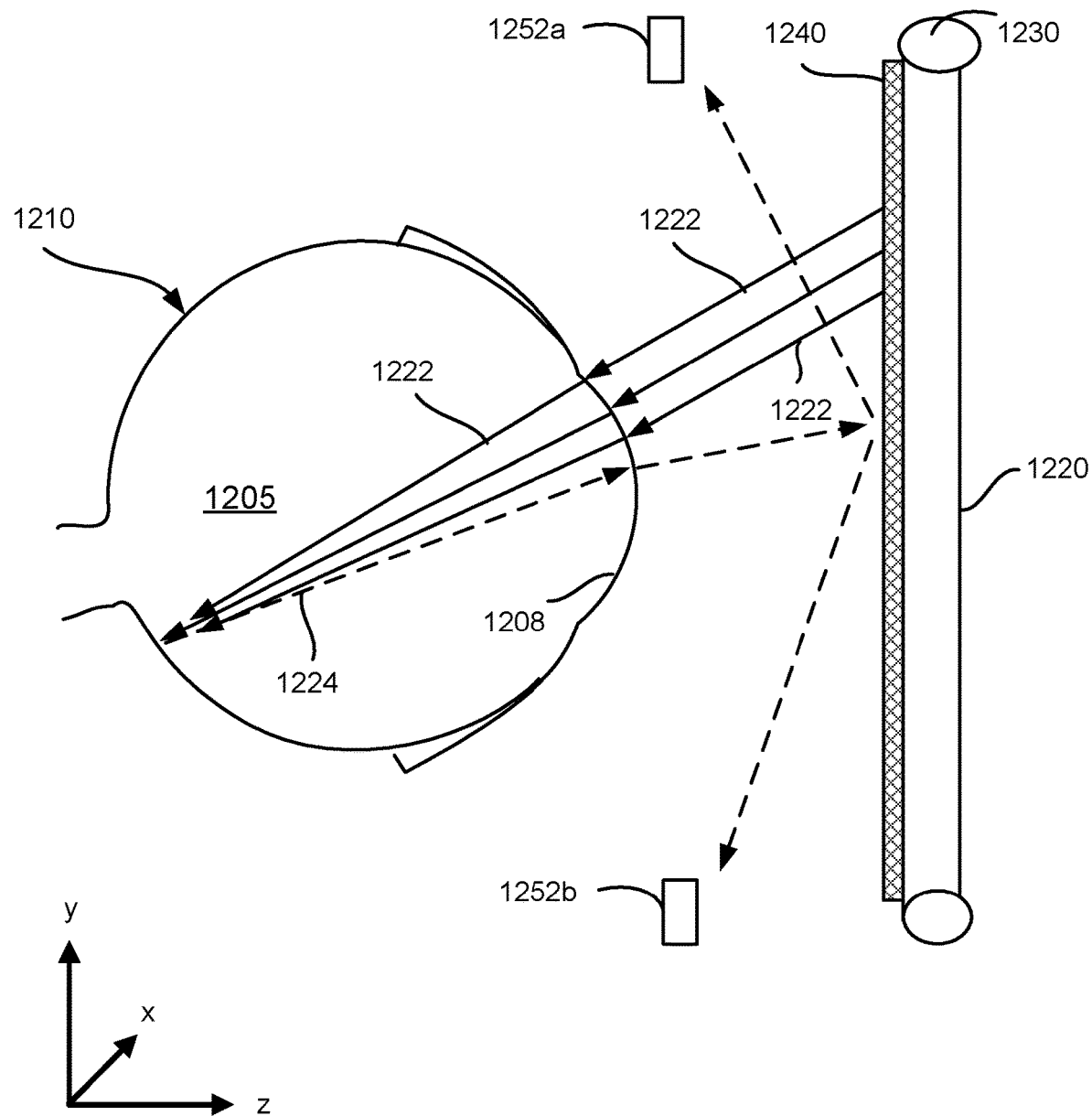
FIG. 12C is a simplified schematic diagram illustrating a side view of an eye tracking system according to another alternative embodiment of the present invention.

FIG. 12C is a simplified schematic diagram illustrating a side view of an eye tracking system according to another alternative embodiment of the present invention. The embodiment illustrated in FIG. 12C shares common elements with the embodiments illustrated in FIGS. 12A and 12B and the description provided in relation to FIGS. 12A and 12B is applicable to FIG. 12C as appropriate. In the embodiment illustrated in FIG. 12C, a diffractive reflector 1240 is integrated with the eyepiece 1220 to reflect, through diffraction, the light reflected from the retina to the one or more detectors 1252. As an example, diffractive reflector 1240, which can be efficient at reflecting infrared wavelengths, could be integrated with the eyepiece 1220 (e.g., laminated to the back of the eyepiece) to reflect light 1224 to detectors 1252*a* and 1252*b*, which can be positioned peripherally and at a longitudinal position (i.e., along the z-axis) between the eyepiece and the eye. For example, detectors 1252*a* and 1252*b* could be mounted in the temples of the glasses. One of ordinary skill in the art would recognize many variations, modifications, and alternatives.

Accordingly, the diffractive reflector illustrated in FIG. 12C provides an alternative to the waveguiding implementations illustrated in FIGS. 12A and 12B. Additionally, the use of the diffractive reflector enable flexibility in the detector placement since the detectors can be moved away from the frame of the glasses, for example, at one or more predetermined positions along the temples of the glasses. As discussed above, the detectors do not need to be image preserving, but can be implemented as high speed photodiodes, reducing system complexity and cost.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An eye tracking system comprising:
   a pair of glasses including two frames;
   a light scanning projector coupled to the pair of glasses and operable to scan a beam of light to project an image frame including a plurality of pixels, each of the plurality of pixels being associated with a pixel position within the image frame;
   an eyepiece mounted in one of the two frames and optically coupled to the light scanning projector, the eyepiece including an exit pupil expander operable to direct at least a portion of the beam of light towards an eye of a user;
   one or more photodetectors coupled to the pair of glasses and operable to detect one or more time-varying reflected signals, wherein each of the one or more time-varying reflected signals is associated with the plurality of pixels of the image frame and includes a series of reflected intensities; and
   a processor coupled to the light scanning projector and the one or more photodetectors, wherein the processor is operable to correlate the reflected intensities in the series of reflected intensities of each of the one or more time-varying reflected signals with the pixel position of each of the plurality of pixels to form a spatial map between the pixel position of each of the plurality of pixels and the reflected intensities in the series of reflected intensities of each of the one or more time-varying reflected signals and determine a first eye orientation.

2. The eye tracking system of claim 1 wherein the light scanning projector comprises a fiber scanning projector.

3. The eye tracking system of claim 1 wherein the pair of glasses include a temple, wherein the light scanning projector is mounted in the one of the two frames and the one or more photodetectors are mounted in the temple.

4. The eye tracking system of claim 3 wherein the one or more photodetectors are mounted in the temple at a longitudinal position between the eyepiece and the eye of the user.

5. The eye tracking system of claim 1 wherein the eyepiece comprises a plurality of planar waveguides.

6. The eye tracking system of claim 1 wherein the light scanning projector is operable to output a display signal and a characterization signal.

7. The eye tracking system of claim 6 wherein the display signal comprises one or more visible wavelengths and the characterization signal comprises one or more non-visible wavelengths.

8. A method of performing eye tracking, the method comprising:
  providing a light scanning projector, an eyepiece mounted in a frame, and one or more optical detectors positioned around a periphery of the frame;
  projecting a first image frame including a first plurality of pixels to an eye using the light scanning projector and the eyepiece, wherein each of the first plurality of pixels is associated with a pixel position within the first image frame;
  detecting one or more time-varying reflected signals using the one or more optical detectors, wherein each of the one or more time-varying reflected signals is associated with the first plurality of pixels of the first image frame and includes a series of first reflected intensities;
  correlating the first reflected intensities in the series of first reflected intensities of each of the one or more time-varying reflected signals with the pixel position of each of the first plurality of pixels to form a first spatial map between the pixel position of each of the first plurality of pixels and the first reflected intensities in the series of first reflected intensities of each of the one or more time-varying reflected signals;
  determining a first eye orientation;
  projecting a second image frame including a second plurality of pixels to the eye using the light scanning projector and the eyepiece, wherein each of the second plurality of pixels is associated with a pixel position within the second image frame;
  detecting a second set of one or more time-varying reflected signals using the one or more optical detectors, wherein each of the second set of one or more time-varying reflected signals is associated with the second plurality of pixels of the second image frame and includes a series of second reflected intensities;
  correlating the second reflected intensities in the series of second reflected intensities of each of the second set of one or more time-varying reflected signals with the pixel position of each of the second plurality of pixels to form a second spatial map between the pixel position of each of the second plurality of pixels and the second reflected intensities in the series of second reflected intensities of each of the second set of one or more time-varying reflected signals; and
  determining a second eye orientation.

9. The method of claim 8 wherein the one or more optical detectors are disposed at a longitudinal position between the eyepiece and the eye.

10. The method of claim 9 wherein the one or more optical detectors are mounted in a temple mechanically coupled to the frame.

11. The method of claim 8 wherein the first eye orientation and the second eye orientation are related by a track, the method further comprising outputting the track via an input/output device.

12. The method of claim 8 wherein the one or more time-varying reflected signals are associated with increasing scan angle of the light scanning projector during the first image frame.

13. The method of claim 8 wherein the second set of one or more time-varying reflected signals are associated with increasing scan angle of the light scanning projector during the second image frame.

14. The method of claim 8 wherein the eyepiece includes a plurality of planar waveguides.

15. The method of claim 14 wherein projecting the first image frame to the eye comprises:
  coupling portions of the first image frame into each of the plurality of planar waveguides; and
  transmitting at least a portion of the coupled portions to the eye.

16. The method of claim 14 wherein projecting the second image frame to the eye comprises:
  coupling portions of the second image frame into each of the plurality of planar waveguides; and
  transmitting at least a portion of the coupled portions to the eye.

17. The method of claim 8 wherein the first image frame and the second image frame are consecutive frames of a video image.

18. The method of claim 8 wherein one or more additional image frames are positioned between the first image frame and the second image frame.

19. The eye tracking system of claim 1 wherein the one or more photodetectors comprises a photodiode.

20. The eye tracking system of claim 1 wherein the light scanning projector is operable to scan the beam of light to project the plurality of pixels of the image frame one at a time.

* * * * *